United States Patent
Kang et al.

(10) Patent No.: US 7,693,520 B2
(45) Date of Patent: Apr. 6, 2010

(54) SYSTEM AND METHOD FOR SELECTING A SERVING BASE STATION ACCORDING TO A DROP OF A MOBILE SUBSCRIBER STATION IN A BROADBAND WIRELESS ACCESS COMMUNICATION SYSTEM

(75) Inventors: Hyun-Jeong Kang, Seoul (KR);
Chang-Hoi Koo, Seongnam-si (KR);
Jung-Je Son, Seongnam-si (KR);
Yeong-Moon Son, Anyang-si (KR);
So-Hyun Kim, Suwon-si (KR);
Sung-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 528 days.

(21) Appl. No.: 11/784,532

(22) Filed: Apr. 6, 2007

(65) Prior Publication Data
US 2007/0249353 A1 Oct. 25, 2007

Related U.S. Application Data

(62) Division of application No. 10/933,673, filed on Sep. 3, 2004, now Pat. No. 7,430,418.

(30) Foreign Application Priority Data
Sep. 4, 2003 (KR) .............................. 61941/2003

(51) Int. Cl.
*H04W 36/00* (2006.01)
(52) U.S. Cl. ........................ 455/436; 455/437; 455/438; 455/439; 455/440; 455/441; 455/442; 455/443
(58) Field of Classification Search .......... 455/436–443
See application file for complete search history.

(56) References Cited

U.S. PATENT DOCUMENTS 5,995,830 A 11/1999 Amin et al.
6,169,900 B1 1/2001 Lahtinen
6,246,872 B1 6/2001 Lee et al.

FOREIGN PATENT DOCUMENTS

| EP | 0 325 713 | 8/1989 |
|---|---|---|
| KR | 1020030056941 | 7/2003 |
| RU | 2 152 694 | 7/2000 |

OTHER PUBLICATIONS

Leiba, "Handoff Procedures for IEEE 802.16e", Submission IEEE 802.16 Meeting No. 24, Mar. 12, 2003, pp. 1-47.

(Continued)

*Primary Examiner*—Lester Kincaid
*Assistant Examiner*—Charles Shedrick
(74) *Attorney, Agent, or Firm*—The Farrell Law Firm, LLP

(57) ABSTRACT

Disclosed are a system and a method for selecting a new serving base station when a drop occurs in a mobile subscriber station in a broadband wireless access communication system including the mobile subscriber station, a serving base station communicating with the mobile subscriber station, and a plurality of neighbor base stations, different from the serving base station. The mobile subscriber station receives information related to the neighbor base stations from the serving base station communicating with the mobile subscriber station. The mobile subscriber station monitors the frequency bands of the neighbor base stations included in the information related to the neighbor base stations if the drop is detected in order to detect target base stations capable of serving as a new serving base station for communicating with the mobile subscriber station when the drop occurs in the mobile subscriber station according to a monitoring result for the frequency bands of the neighbor base stations. The mobile subscriber station selects the new serving base station from the detected target base stations so that the it is possible for the mobile subscriber station to reestablish the communication with regard to the new serving base station within a short period of time.

62 Claims, 17 Drawing Sheets

OTHER PUBLICATIONS

Institute of Electrical and Electronics Engineers: "Part 16: Air Interface for Fixed Broadband Wireless Access Systems—Amendment 2: Medium Access Control, Modifications and Additional Physical Layer Specifications for 2-11 Ghz", IEEE Standard for Local and Metropolitan Area Networks 802.16A, Apr. 1, 2003, pp. 1-3, 80-87 and 219.

Eklund et al., "IEEE Standard 802.16: A Technical Overview of the Wirelessman Air Interface for Broadband Wireless Access", IEEE Communications Magazine, vol. 40, No. 6, Jun. 2002, pp. 98-107.

Mouly et al., "GSM—The System for Mobile Communications, 6.1.4 Handover Preparation", GSM System for Mobile Communications, 1993, pp. 327-330.

Mouly et al., "Call Re-Establishment", GSM System for Mobile Communications, 1993, pp. 412-415.

Changhoi Koo et al., Comments on IEEE 802.16E Handoff Draft, IEEE 802.16 Broadband Wireless Access Working Group, Mar. 11, 2003.

IEEE Standard for Local and Metropolitan Area Networks—Part 16: Air Interface for Fixed Broadband Wireless Access Systems—Amendment 2: Medium Access Control Modifications and Additional Physical Layer Specifications for 2-11 Ghz, 802.16a, Apr. 1, 2003, pp. 201-203.

Koo et al., Fast Call Recovery for Drop Call During Ho, IEEE 802.16 Broadband Wireless Access Working Group, Nov. 7, 2003.

SYSTEM AND METHOD FOR SELECTING A SERVING BASE STATION ACCORDING TO A DROP OF A MOBILE SUBSCRIBER STATION IN A BROADBAND WIRELESS ACCESS COMMUNICATION SYSTEM

PRIORITY

This application is a Divisional Application of U.S. patent application Ser. No. 10/933,673 filed Sep. 3, 2004, now U.S. Pat. No. 7,430,418 which claims priority to an application entitled "System And Method For Selecting Serving Base Station According To Drop Of Mobile Subscriber Station In Broadband Wireless Access Communication System" filed with the Korean Intellectual Property Office on Sep. 4, 2003 and assigned Ser. No. 2003-61941, the contents of which are incorporated herein by reference.

BACKGROUND OF THE INVENTION

1. Field of the Invention

The present invention relates to a broadband wireless access communication system, and more particularly to an apparatus and a method for selecting a serving base station according to a drop of a mobile subscriber station during a communication.

2. Description of the Related Art

Recently, extensive studies and research have been being carried out for the $4^{th}$ generation ("4G") communication systems in order to provide subscribers with services having a superior quality of service ("QoS") at higher transmission speeds. In particular, studies are being actively carried out in relation to the 4G communication systems in order to provide high speed services having a superior QoS through broadband wireless access communication systems, such as wireless local area network ("LAN") communication systems and wireless metropolitan area network ("MAN") communication systems, while ensuring the mobility of the broadband wireless access communication systems.

The wireless MAN communication system has a wide service coverage area and provides data at a higher transmission speed than a LAN system, and as such the wireless MAN communication system is adaptable for a high-speed communication service. However, the wireless MAN communication system does not take into consideration the mobility of a user, that is, subscriber station ("SS"), so a handover, which is required when the SS moves at a high speed, is not taken into consideration in the wireless MAN communication system. The wireless MAN communication system is one type of broadband wireless access communication system and has a wider service coverage area and higher transmission speed as compared with those of a wireless LAN communication system.

In order to provide a broadband transport network for a physical channel of the wireless MAN communication system, an IEEE (Institute of Electrical and Electronics Engineers) 802.16a communication system utilizing an orthogonal frequency division multiplexing ("OFDM") scheme and an orthogonal frequency division multiple access ("OFDMA") scheme has been suggested.

As the IEEE 802.16a communication system applies the OFDM/OFDMA schemes to the wireless MAN system, the physical channel signals can be transmitted through a plurality of sub-carriers so that a high-speed data transmission is possible. In short, the IEEE 802.16a communication system is a broadband wireless access communication system using the OFDM/OFDMA schemes.

Hereinafter, a structure of a conventional IEEE 802.16a communication system will be described with reference to FIG. 1.

FIG. 1 is a structure diagram schematically illustrating the conventional IEEE 802.16a communication system.

Referring to FIG. 1, the IEEE 802.16a communication system has a single cell structure and includes a base station (BS) 100 and a plurality of SSs 110, 120 and 130 managed by the base station 100. The base station 100 conducts communications with the SSs 110, 120 and 130 using the OFDM/OFDMA schemes.

Hereinafter, a structure of a downlink frame of the IEEE 802.16a communication system will be described with reference to FIG. 2.

FIG. 2 is a structure diagram schematically illustrating the structure of the downlink frame of the IEEE 802.16a communication system.

Referring to FIG. 2, the downlink frame includes a preamble field 200, a broadcast control field 210, and a plurality of time division multiplex ("TDM") fields 220 and 230. A synchronous signal, that is, a preamble sequence for synchronizing the SSs with the base station, is transmitted through the preamble field 200. The broadcast control field 210 includes a DL (downlink)_MAP field 211 and a UL (uplink)_MAP field 213. The DL_MAP field 211 is a field for transmitting a DL_MAP message. Information elements ("IEs") included in the DL_MAP message are represented in Table 1.

TABLE 1

| Syntax | Size | Notes |
| --- | --- | --- |
| DL_MAP_Message_Format( ) { | | |
| Management Message Type=2 | 8 bits | |
| PHY Synchronization Field | Variable | See Appropriate PHY specification |
| DCD Count | 8 bits | |
| Base Station ID | 48 bits | |
| Number of DL_MAP Element n | 16 bits | |
| Begin PHY Specific section { | | See Applicable PHY section |
| for (i=1; i<=n; i++) | | For each DL_MAP element 1 to n |
| DL_MAP Information Element( ) | Variable | See corresponding PHY specification |
| if!(byte boundary) { | 4 bits | Padding to reach byte boundary |
| Padding Nibble | | |
| } | | |
| } | | |
| } | | |
| } | | |

As shown in Table 1, the DL_MAP message includes a plurality of IEs, such as Management Message Type representing a message type to be transmitted, PHY (physical) Synchronization Field corresponding to modulation/demodulation schemes applied to a physical channel for achieving synchronization, DCD Count representing a count according to the variation of a configuration of a downlink channel descript ("DCD") message including a downlink burst profile, Base Station ID, and Number of DL_MAP Elements n representing the number of elements remaining after the Base Station ID. Although it is not shown in Table 1, the DL_MAP message also includes information related to the ranging codes assigned to each ranging, which will be described later.

In addition, the UL_MAP field 213 is a field for transmitting a UL_MAP message. IEs included in the UL_MAP message are represented in Table 2.

TABLE 2

| Syntax | Size | Notes |
|---|---|---|
| UL_MAP_Message_Format( ) { | | |
| Management Message Type=3 | 8 bits | |
| Uplink Channel ID | 8 bits | |
| UCD Count | 8 bits | |
| Number of UL_MAP Element n | 16 bits | |
| Allocation Start Time | 32 bits | |
| Begin PHY Specific section { | | See Applicable PHY section |
| for (i=1; i<=n; i++) | | For each UL_MAP element 1 to n |
| UL_MAP_Information_Element( ) | Variable | See corresponding PHY specification |
| } | | |
| } | | |
| } | | |

As shown in Table 2, the UL_MAP message includes a plurality of IEs, such as Management Message Type representing a message type to be transmitted, Uplink Channel ID representing an available uplink channel ID, UCD Count representing a count according to the variation of a configuration of an uplink channel descript ("UCD") message including an uplink burst profile, and Number of UL_MAP Elements n representing the number of elements remaining after the UCD count. The Uplink Channel ID is allocated only to a medium access control ("MAC") sub-layer.

The TDM field s 220 and 230 are field s corresponding to time slots which are allocated according to the TDM/TDMA (time division multiple access) schemes corresponding to the SSs. The base station transmits broadcast information to the SSs, which are managed by the base station, through the DL_MAP field 211 of the downlink frame by using a predetermined center carrier. As the SSs are powered on, the SSs monitor all frequency bands, which are preset in the SSs, in order to detect a reference channel signal, such as a pilot channel signal having the highest carrier to interference and noise ratio ("CINR").

An SS selects a base station, which has transmitted to the SS the pilot signal having the highest CINR, as a base station for the SS. The SS can then recognize information controlling the uplink and the downlink of the SS and information representing a real data transmission/reception position by checking the DL_MAP field 211 and the UL_MAP field 213 of the downlink frame transmitted from the base station.

A configuration of the UCD message is represented in Table 3.

TABLE 3

| Syntax | Size | Notes |
|---|---|---|
| UCD-Message_Format( ) { | | |
| Management Message Type=0 | 8 bits | |
| Uplink channel ID | 8 bits | |
| Configuration Change Count | 8 bits | |
| Mini-slot size | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded Information for the overall channel | Variable | |
| Begin PHY Specific Section { | | |
| for(i=1; i<n; i+n) | | |
| Uplink_Burst_Descriptor | Variable | |
| } | | |
| } | | |
| } | | |

As shown in Table 3, the UCD message includes a plurality of IEs, such as Management Message Type representing a message type to be transmitted, Uplink channel ID representing an available uplink channel ID, Configuration Change Count counted in the base station, mini-time slot size representing a size of a mini-time slot of an uplink physical channel, Ranging Backoff start representing a start point of backoff using an initial ranging, that is, representing a size of an initial backoff window using the initial ranging, Ranging Backoff End representing an end point of backoff using an initial ranging, that is, representing a size of a final backoff window, Request Backoff start representing a start point of backoff for contention data and requests, that is, representing a size of an initial backoff window, and Request Backoff End representing an end point of backoff for contention data and requests, that is, representing a size of a final backoff window. A backoff value is a waiting time required for the next ranging if the present ranging fails. If the SS fails to perform the ranging, the base station must transmit the backoff value, i.e. the waiting time for the next ranging, to the SS. For instance, if the backoff value is determined as "10" based on the ranging backoff start and the ranging backoff end, the SS must perform the next ranging after by passing $2^{10}$ ranging chances (1024 ranging chances) according to a truncated binary exponential backoff algorithm.

A structure of an uplink frame of the IEEE 802.16a communication system will be described with reference to FIG. 3.

FIG. 3 is a structure diagram schematically illustrating the structure of the uplink frame of the IEEE 802.16a communication system.

Prior to explaining FIG. 3, a description will be made in relation to rangings, such as an initial ranging, a maintenance ranging, that is, a periodic ranging, and a bandwidth request ranging, used for the IEEE 802.16a communication system.

First, the initial ranging will be described. The initial ranging is carried out in order to synchronize the base station with the SS, in which a time offset and a transmit power between the SS and the base station are precisely adjusted. That is, after the SS has been powered on, the SS receives the DL_MAP message and the UL_MAP/UCD message in order to synchronize with the base station. Then, the initial ranging is carried out with respect to the SS in order to adjust the time offset and the transmit power of the SS in relation to the base station. Herein, since the IEEE 802.16a communication system uses the OFDM/OFDMA schemes, ranging sub-channels and ranging codes are required for the initial ranging. Thus, the base station assigns available ranging codes to the SS according to the object or the type of rangings.

In detail, the ranging codes are created by segmenting a pseudo-random noise ("PN") sequence having a predetermined bit length into predetermined ranging code units. In general, two ranging sub-channels, having a 53-bit length, forms one ranging channel and a PN code is segmented through a ranging channel having a 106-bit length, thereby forming the ranging codes. Such ranging codes are assigned to the SS, for instance, a maximum of 48 ranging codes (RC #1 to RC #48) can be assigned to the SS. At least two ranging codes are used for the initial ranging, the periodic ranging and the bandwidth request ranging as default values with respect to each SS. That is, the ranging codes are differently assigned according to the initial ranging, the periodic ranging and the bandwidth request ranging. For instance, N ranging codes are assigned for the initial ranging, M ranging codes are assigned for the periodic ranging, and L ranging codes are assigned for the bandwidth request ranging. As mentioned above, the assigned ranging codes are transmitted to the SS through the UCD message and the SS performs the initial ranging by using the ranging codes included in the UCD message in match with objects of the ranging codes.

Second, the periodic ranging will be described. The periodic ranging is periodically carried out by means of the SS having the time offset and the transmit power adjusted through the initial ranging, in such a manner that the SS can adjust the channel status with respect to the base station. The SS performs the periodic ranging by using ranging codes assigned thereto for the periodic ranging.

Third, the periodic ranging will be described. The bandwidth request ranging is carried out by means of the SS having the time offset and the transmit power adjusted through the initial ranging, wherein the SS requests a bandwidth assignment in order to communicate with the base station.

Referring back to FIG. 3, the uplink frame consists of an initial maintenance opportunities field 300 using the initial ranging and the maintenance ranging, that is, the periodic ranging, a request contention opportunities field 310 using the bandwidth request ranging, and SS scheduled data fields 320 including uplink data of the SSs. The initial maintenance opportunities field 300 includes a plurality of access burst intervals including the real initial ranging and the periodic ranging and a collision interval created because of the collision between the access burst intervals. The request contention opportunities field 310 includes a plurality of bandwidth request intervals including the real bandwidth request ranging and a collision interval created because of the collision between the bandwidth request intervals. In addition, the SS scheduled data fields 320 consist of a plurality of SS scheduled data fields (first SS scheduled data field to SS $N^{th}$ scheduled data field) and SS transition gaps formed between the SS scheduled data fields (first SS scheduled data field to SS $N^{th}$ scheduled data field).

An uplink interval usage code ("UIUC") field is provided for recoding information representing the usage of the offset recorded in the offset field. The UIUC field is shown in Table 4.

As shown in Table 4, if "2" is recorded in the UIUC field, the starting offset used for the initial ranging is recorded in the offset field. If "3" is recorded in the UIUC field, the starting offset used for the bandwidth request ranging or the maintenance ranging is recorded in the offset field. As mentioned above, the offset field is provided to record starting offset values used for the initial ranging, the bandwidth request ranging or the maintenance ranging corresponding to information recorded in the UIUC field. Information related to the characteristics of a physical channel transmitted from the UIUC field is recorded in the UCD.

A ranging process between the base station and the SS in the IEEE 802.16a communication system will be described with reference to FIG. 4.

FIG. 4 is a signal flow diagram illustrating the ranging process between the base station and the SS in the IEEE 802.16a communication system.

Referring to FIG. 4, as an SS 400 is powered on, the SS 400 monitors all of the frequency bands, which are preset in the SS 400, in order to detect a pilot channel signal having the highest CINR. In addition, the SS 400 selects a base station 420 which has transmitted the pilot signal having the highest CINR to the SS 400 as a base station for the SS 400, so the SS 400 receives the preamble of the downlink frame transmitted from the base station 420, thereby obtaining system synchronization with respect to the base station 420.

As described above, when the system synchronization is attained between the SS 400 and the base station 420, the base station 420 transmits the DL_MAP message and the UL_MAP message to the SS 400 (steps 411 and 413). Herein, as described above with reference to Table 1, the DL_MAP message notifies the SS 400 of the information required for the SS 400 to obtain the system synchronization with respect to the base station 420 in the downlink and information about a structure of the physical channel capable of receiving messages transmitted to the SS 400 from the downlink. In addition, as describe above with reference to Table 2, the UL_MAP message notifies the SS 400 of the information about a scheduling period of the SS 400 in the uplink and the structure of the physical channel. In addition, the DL_MAP message is periodically broadcast to all of the SSs from the base station 420. If a predetermined SS, that is, if the SS 400 can continuously receive the DL_MAP message, it will be represented that the SS 400 is synchronized with the base

TABLE 4

| IE name | UIUC | Connection ID | Description |
| --- | --- | --- | --- |
| reserved | 0 | NA | Reserved for future use. |
| Request | 1 | any | Starting offset of request region. |
| Initial Maintenance | 2 | broadcast | Starting offset of maintenance region (used in Initial Ranging). |
| Station Maintenance | 3 | unicast | Starting offset maintenance region (used in Periodic Ranging). |
| Data Grant Burst Type 1 | 4 | unicast | Starting offset of Data Grant Burst Type 1 assignment. |
| Data Grant Burst Type 2 | 5 | unicast | Starting offset of Data Grant Burst Type 2 assignment. |
| Data Grant Burst Type 3 | 6 | unicast | Starting offset of Data Grant Burst Type 3 assignment. |
| Data Grant Burst Type 4 | 7 | unicast | Starting offset of Data Grant Burst Type 4 assignment. |
| Data Grant Burst Type 5 | 8 | unicast | Starting offset of Data Grant Burst Type 5 assignment. |
| Data Grant Burst Type 6 | 9 | unicast | Starting offset of Data Grant Burst Type 6 assignment. |
| Null IE | 10 | zero | Ending offset of the previous grant. Used to bound the length of the last actual interval allocation. |
| Empty | 11 | zero | Used to schedule gaps in transmission. |
| reserved | 12-15 | N/A | Reserved. | station 420. That is, the SS 400 receiving the DL_MAP message can receive all of the messages transmitted to the downlink. In addition, as described above with reference to Table 3, if the SS 400 fails to access to the base station 420, the base station 420 transmits the UCD message including the information representing the available backoff value to the SS 400.

The SS 400, which has been synchronized with the base station 420, transmits a ranging request ("RNG_REQ") message to the base station 420 (step 415). Upon receiving the RNG_REQ message from the SS 400, the base station 420 transmits a ranging response ("RNG_RSP") message including information required for correcting frequency for the ranging, time and transmit power to the SS 400 (step 417).

A configuration of the RNG_REQ message is represented in Table 5.

TABLE 5

| Syntax | Size | Notes |
|---|---|---|
| RNG-REQ_Message_Format( ) { | | |
| Management Message Type = 4 | 8 bits | |
| Downlink Channel ID | 8 bits | |
| Pending Until Complete | 8 bits | |
| TLV Encoded Information | Variable | TLV specific |
| } | | |

In Table 5, the "Downlink Channel ID" is a downlink channel identifier included in the RNG_REQ message received in the SS through the UCD and the "Pending Until Complete" is a priority of transmitted ranging responses. If the "Pending Until Complete" is "0", a previously transmitted ranging response has a priority, and if the "Pending Until Complete" is not "0", a presently transmitted ranging response has a priority.

A configuration of the RNG_RSP message is represented in Table 6.

TABLE 6

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | Variable | TLV specific |
| } | | |

In Table 6, the "Uplink Channel ID" is an ID of an uplink channel included in the RNG_REQ message. Since the IEEE 802.16a communication system shown in FIG. 4 relates to a fixed SS, that is, since the IEEE 802.16a communication system shown in FIG. 4 does not take into consideration the mobility of the SS, the base station 420 communicating with the SS 400 becomes a serving base station.

The IEEE 802.16a communication system has the signal cell structure in which the mobility of the SS is not considered. Meanwhile, an IEEE 802.16e communication system is defined as a communication system in which the mobility of the SS is added to the IEEE 802.16a communication system. Thus, the IEEE 802.16e communication system must consider the mobility of the SS under a multi-cell environment. In order to ensure the mobility of the SS under the multi-cell environment, the operations of the SS and the base station must be changed. To this end, various studies have been carried out relating to a handover of the SS in order to provide for the mobility to the SS under the multi-cell environment.

A structure of a conventional IEEE 802.16e communication system will be described with reference to FIG. 5.

FIG. 5 is a structure diagram schematically illustrating the structure of the conventional IEEE 802.16e communication system.

Referring to FIG. 5, the IEEE 802.16e communication system has a multi-cell structure consisting of cells 500 and 550 and includes a first base station 510 for managing the cell 500, a second base station 540 for managing the cell 550, and a plurality of mobile subscriber stations ("MSSs") 511, 513, 530, 551, and 553. The MSS signify an SS having mobility. The base stations 510 and 540 communicate with the MSSs 511, 513, 530, 551, and 553 using the OFDM/OFDMA schemes. From among the MSSs 511, 513, 530, 551, and 553, the MSS 530 is positioned in a boundary cell formed between the cell 500 and the cell 550, that is, the MSS 530 is positioned in a handover region. Thus, the MSS 530 must be provided with a handover function in order to realize the mobility of the MSS 530.

In the IEEE 802.16e communication system, a MSS receives pilot channel signals transmitted from a plurality of base stations and measures the CINR of the pilot channel signals. In addition, the MSS selects a base station, which has transmitted a pilot signal having a highest CINR, as a base station of the MSS. That is, the MSS regards the base station transmitting the pilot signal having the highest CINR as a serving base station of the MSS. After selecting the serving base station, the MSS receives the downlink frame and the uplink frame transmitted from the serving base station. Herein, the downlink frame and the uplink frame of the IEEE 802.16e communication system have structures identical to those of the downlink frame and the uplink frame of the IEEE 802.16a communication system described with reference to FIGS. 2 and 3.

The serving base station transmits a mobile neighbor advertisement ("MOB_NBR_ADV") message to the MSS. A configuration of the MOB_NBR_ADV message is represented in Table 7.

TABLE 7

| Syntax | Size | Notes |
|---|---|---|
| MOB_NBR-ADV_Message_Format( ) { | | |
| Management Message Type = 48 | 8 bits | |
| Configuration Change Count | 8 bits | |
| N_NEIGHBORS | 8 bits | |
| For (j=0 ; j<N_NEIGHBORS ; j++) { | | |
| Neighbor BS-ID | 48 bits | |
| Physical Frequency | 32 bits | |
| TLV Encoded Neighbor information | Variable | TLV specific |
| } | | |
| } | | |

As shown in Table 7, the MOB_NBR_ADV message includes a plurality of IEs, such as Management Message Type representing a message type to be transmitted, Configuration Change Count representing the number of configurations to be changed, N_NEIGHBORS representing the number of neighbor base stations, Neighbor BS-ID representing identifiers of neighbor base stations, Physical Frequency representing a physical channel frequency of the neighbor base stations, and TLV (type length variable) Encoded Neighbor Information representing variable information about the neighbor base stations.

After receiving the MOB_NBR_ADV message, the MSS transmits a mobile scanning interval allocation request ("MOB_SCN_REQ") message to the serving base station if it is necessary to scan the CINRs of the pilot channel signals transmitted from the neighbor base stations. A scan request time of the MSS for scanning the CINRs of the pilot channel signals transmitted from the neighbor base stations does not directly relate to the CINR scanning operation, so it will not be further described below. A configuration of the MOB_SCN_REQ message is represented in Table 8.

TABLE 8

| Syntax | Size | Notes |
|---|---|---|
| MOB_SCN-REQ_Message_Format( ) { | | |
|    Management Message Type = ? | 8 bits | |
|    Scan Duration | 16 bits | Units are frames. |
| } | | |

As shown in Table 8, the MOB_SCN_REQ message includes a plurality of IEs, such as Management Message Type representing a message type to be transmitted, and Scan Duration representing a scan interval for scanning the CINRs of the pilot channel signals transmitted from the neighbor base stations. The scan duration is formed in a frame unit. In Table 8, the Management Message Type for the MOB_SCN_REQ message is not yet defined (Management Message Type=undefined).

After receiving the MOB_SCN_REQ message, the serving base station transmits a mobile scanning interval allocation response ("MOB_SCN_RSP") message including scan information, which must be scanned by the MSS, to the MSS. A configuration of the MOB_SCN_RSP message is represented in Table 9.

TABLE 9

| Syntax | Size | Notes |
|---|---|---|
| MOB_SCN-RSP_Message_Format( ) { | | |
|    Management Message Type = ? | 8 bits | |
|    Length | 8 bits | in bytes |
|    For (i=0 ; i<Length/3; i++) { | | |
|       CID | 16 bits | basic CID of the MSS |
|       Duration | 8 bits | in frames |
|    } | | |
| } | | |

As shown in Table 9, the MOB_SCN_RSP message includes a plurality of IEs, such as Management Message Type representing a message type to be transmitted, Connection ID ("CID") of the MSS, which has transmitted the MOB_SCN_REQ message and Duration. In Table 9, the Management Message Type for the MOB_SCN_RSP message is not yet defined (Management Message Type=undefined). The Duration represents an area in which the MSS scans the CINR of the pilot channel signal. After receiving the MOB_SCN_RSP message including the scanning information, the MSS scans the CINRs of the pilot signals of the neighbor base stations included in the MOB_SCN_RSP message corresponding to scanning information parameters.

In order to provide the handover function in the IEEE 802.16e communication system, the MSS must measure the CINRs of the pilot channel signals transmitted from the neighbor base stations and the base station of the MSS, that is, the serving base station. If the CINR of the pilot channel signals transmitted from the serving base station is less than the CINRs of the pilot channel signals transmitted from the neighbor base stations, the MSS sends a signal requesting the handover to the serving base station.

A handover process according to the request of the MSS in the conventional IEEE 802.16e communication system will be described with reference to FIG. 6.

FIG. 6 is a signal flow diagram illustrating the handover process according to the request of the MSS in the conventional IEEE 802.16e communication system.

Referring to FIG. 6, a serving base station 610 transmits an MOB_NBR_ADV message to an MSS 600 (step 611). Upon receiving the MOB_NBR_ADV message from the serving base station 610, the MSS 600 obtains information related to the neighbor base stations and transmits an MOB_SCN_REQ message to the serving base station 610 if it is necessary to scan ("scan" and "measure" will be used synonymously with respect to determining CINRs) the CINRs of pilot channels signals transmitted from the neighbor base stations (step 613). A scan request time of the MSS 600 for scanning the CINRs of the pilot channel signals transmitted from the neighbor base stations does not directly relate to the CINR scanning operation, so it will not be further described below. The serving base station 610 receiving the MOB_SCN_REQ message transmits an MOB_SCN_RSP message including scanning information, which must be scanned by the MSS 600, to the MSS 600 (step 615). Upon receiving the MOB_SCN_RSP message including scanning information from the serving base station 610, the MSS 600 scans parameters included in the MOB_SCN_RSP message, that is, the MSS 600 scans the CINRs of the pilot channel signals of the neighbor base stations obtained through the MOB_NBR_ADV message (step 617). Although a process for measuring the CINR signal of the pilot channel signal transmitted from the serving base station 610 is not separately illustrated in FIG. 6, the MSS 600 may continuously measure the CINR of the pilot channel signal transmitted from the serving base station 610.

After scanning the CINRs of the pilot channel signals transmitted from the neighbor base stations, if the MSS 600 decides to change the serving base station thereof (step 619), that is, if the MSS 600 decides to replace the serving base station 610 with a new base station having a structure different from the structure of the serving base station 610 the MSS 600 transmits a mobile MSS handover request ("MOB_MSSHO_REQ") message to the serving base station 610. Herein, a base station, which can be selected as the new base station due to the handover of the MSS 600, is called a "target BS". A configuration of the MOB_MSSHO_REQ message is represented in Table 10.

TABLE 10

| Syntax | Size | Notes |
|---|---|---|
| MOB_MSSHO-REQ_Message_Format( ) { | | |
|    Management Message Type = 52 | 8 bits | |
|    N_Recommended | 8 bits | |
|    For (j=0 ; j<N_NEIGHBORS ; j++) { | | |
|       Neighbor BS-ID | 48 bits | |
|       BS S(N+1) | 8 bits | |
|       Service level prediction | 8 bits | |
|    } | | |
| } | | |

As shown in Table 10, the MOB_MSSHO_REQ message includes a plurality of IEs, such as Management Message Type representing a message type to be transmitted, and a scanning result of the MSS 600. In Table 10, N_Recommended represents the number of neighbor base stations, which have transmitted pilot channel signals having CINRs greater than a predetermined CINR, detected through the scanning operation of the MSS 600 for the CINRs of the pilot channel signals transmitted from the neighbor base station. That is, the N_Recommended represents the number of neighbor base stations capable of performing the handover for the MSS 600. The MOB_MSSHO_REQ message also includes identifiers of the neighbor base stations represented by the N_Recommended, the CINRs of the pilot signals transmitted from the neighbor base stations, and a service level expected to be transmitted to the MSS 600.

The serving base station 610 receives the MOB_MSSHO_REQ message transmitted from the MSS 600 and detects a list of target base stations allowing the handover of the MSS 600 based on N_Recommended information of the MOB_MSSHO_REQ message (step 623). In the following description, the list of target base stations allowing the handover of the MSS will be referred to as a "handover-support target base station list" for the purpose of convenience. According to FIG. 6, a first target base station 620 and a second target base station 630 may exist in the handover-support target base station list. Of course, the handover-support target base transmits a handover notification ("HO_notification") message to the target base stations included in the handover-support target base station list, such as the first target base station 620 and the second target base station 630 (steps 625 and 627). A configuration of the HO_notification message is represented in Table 11.

TABLE 11

| Field | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   Estimated Time to HO | 16-bit | In milliseconds, relative to the time stamp, value 0 of this parameter indicates that no actual HO is pending |
|   Required BW | 8-bit | Bandwith which is required by MSS (to gurarantee minimum packet data transmission) |
|   Required QoS | 8-bit | Name of Service Class representing AuthorizedQoSParamSet |
| } | | |
| Security field | TBD | A means to authenticate this message |
| CRC field | 32-bit | IEEE CRC-32 |

As shown in Table 11, the HO_notification message includes a plurality of IEs, such as an ID of the MSS 600 to be handed-over to the first target base station 620 or the second target base station 630, an expected handover start time of the MSS 600, a bandwidth provided from the target base station, that is, a bandwidth provided from a new serving base station according to a request of the MSS 600, and a service level provided to the MSS 600. The bandwidth and the service level requested by the MSS 600 are identical to the expected service level information recorded in the MOB_MSSHO_REQ message described with reference to FIG. 10.

The first and second target base stations 620 and 630 receive the HO_notification message from the serving base station 610 and transmit an HO_notification response message to the serving base station 610 (steps 629 and 631). A configuration of the HO_notification response message is represented in Table 12.

As shown in Table 12, the HO_notification response message includes a plurality of IEs, such as an ID of the MSS 600 to be handed-over to the target base stations, ACK/NACK representing a response of the target base stations with regard to a handover request of the MSS 600, and information related to the bandwidth and the service level which must be provided from each target base station when the MSS 600 is handed-over to the target base station.

The serving base station 610 receives the HO_notification response message from the first and second target base stations 620 and 630 and analyzes the HO_notification response message in order to select a final base station capable of providing an optical bandwidth and an optical service level to the MSS 600 when the MSS 600 is handed-over to the base station. For instance, if the service level provided from the first target base station 620 is less than the service level requested by the MSS 600 and the service level provided from the second target base station 630 is identical to the service level requested by the MSS 600, the serving base station 610 selects the second target base station 630 as the final target base station performing a handover operation in relation to the MSS 600. Thus, the serving base station 610 transmits an HO_notification conform message to the second target base station 630 in response to the HO_notification response message (step 633). A configuration of the HO_notification confirm message is represented in Table 13.

TABLE 12

| Field | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   QoS Estimated | 8-bit | Bandwidth which is provided by BS (to guarantee minimum packet data transmission) TBD how to set this field |
|   BW Estimated | 8-bit | Quality of Service level<br>  Unsolicited Grant Service (UGS)<br>  Real-time Polling Service (rtPS)<br>  Non-real-time Polling Service (nrtPS)<br>  Best Effort |
|   ACK/NACK | 1-bit | Acknowledgement or Negative acknowledgement<br>  1 is Acknowledgement which means that the neighbor BS accepts the HO-notification message from the serving BS<br>  0 is Negative acknowledgement which means that the neighbor BS may not accept the HO-notification message from the serving BS |
| } | | |
| Security field | TBD | A means to authenticate this message |
| CRC field | 32-bit | IEEE CRC-32 |

TABLE 13

| Field | Size | Notes |
|---|---|---|
| Global Header | 152-bit | |
| For (j=0; j<Num Records; j++) { | | |
|   MSS unique identifier | 48-bit | 48-bit universal MAC address of the MSS (as provided to the BS on the RNG-REQ message) |
|   QoS Estimated | 8-bit | Bandwidth which is provided by BS (to guarantee minimum packet data transmission) TBD how to set this field |
|   BW Estimated | 8-bit | Quality of Service level<br>    Unsolicited Grant Service (UGS)<br>    Real-time Polling Service (rtPS)<br>    Non-real-time Polling Service (nrtPS)<br>    Best Effort Service (BE) |
| } | | |
| Security field | TBD | A means to authenticate this message |
| CRC field | 32-bit | IEEE CRC-32 |

As shown in Table 13, the HO_notification confirm message includes a plurality of IEs, such as an ID of the MSS 600 to be handed-over to the selected target base station, and information about a bandwidth and a service level which must be provided from the selected target base station when the MSS 600 is handed-over to the selected target base station.

In addition, the serving base station 610 transmits a mobile handover response ("MOB_HO_RSP") message to the MSS 600 in response to the MOB_MSSHO_REQ message (step 635). The MOB_HO_RSP message includes information about the target base station performing the handover operation in relation to the MSS 600. A configuration of the MOB_HO_RSP message is represented in Table 14.

TABLE 14

| Syntax | Size | Notes |
|---|---|---|
| MOB_HO-RSP_Message_Format( ) { | | |
|   Management Message Type = 53 | 8 bits | |
|   Estimated HO time | 8 bits | |
|   N_Recommended | 8 bits | |
|   For (j=0 ; j<N_NEIGHBORS ; j++) { | | |
|     Neighbor BS-ID | 48 bits | |
|     service level prediction | 8 bits | This parameter exists only when the message is sent by the BS |
|   } | | |
| } | | |

As shown in Table 14, the MOB_HO_RSP message includes a plurality of IEs, such as Management Message Type representing a message type to be transmitted, an expected handover start time, and target serving stations selected from the serving base stations. In addition, N_Recommended of the MOB_HO_RSP message represents the number of target base stations capable of providing the bandwidth and service level requested by the MSS 600 among target base stations included in the handover-support target base station list. The MOB_HO_RSP message is marked with the identifiers of the target base stations represented by the N_Recommended and a service level expected to be provided to the MSS 600 from the target base station. Although FIG. 6 illustrates that the information of one target base station, that is, information about the second target base station 630, is only included in the MOB_HO_RSP message from among the target base stations included in the handover-support target base station list, if there are a plurality of target base stations capable of providing the bandwidth and service level requested by the MSS in the handover-support target base station list, the MOB_HO_RSP message may include information related to the plurality of target base stations.

Upon receiving the MOB_HO_RSP message, the MSS 600 analyzes information included in the MOB_HO_RSP message in order to select a target base station for performing the handover operation in relation to the MSS 600. After selecting the target base station, the MSS 600 transmits a mobile handover indication ("MOB_HO_IND") message to the serving base station 610 in response to the MOB_HO_RSP message (step 637). A configuration of the MOB_HO_IND message is represented in Table 15.

TABLE 15

| Syntax | Size | Notes |
|---|---|---|
| MOB_HO_IND_Message_Format( ) { | | |
|   Management Message Type = 54 | 8 bits | |
|   TLV Encoded Information | Variable | TLV specific |
|   Target_BS_ID | 48 bits | |
| } | | |

As shown in Table 15, the MOB_HO_IND message includes a plurality of IEs, such as Management Message Type representing a message type to be transmitted, an identifier of a final target base station selected by the MSS 600, and TLV Encoded Information representing variable Encoded information.

The serving base station 610 receiving the MOB_HO_IND message recognizes that the MSS 600 will be handed-over to the target base station, that is, the second target base station 630 based on the MOB_HO_IND message so that the serving base station 610 releases a link connecting the serving base station 600 to the MSS 600 (step 639). If the link connecting the MSS 600 to the serving base station 600 has been released, the MSS 600 is handed-over to the second target base station 630.

The handover process according to the request of the base station in the conventional IEEE 802.16e communication system will be described with reference to FIG. 7.

FIG. 7 is a signal flow diagram showing the handover process according to the request of the base station in the conventional IEEE 802.16e communication system.

It is noted that the handover process according to the request of the base station may occur when an overload is applied to the base station so that it is necessary to distribute the load of the base station to neighbor base stations or when it is necessary to deal with the status variation of the uplink of the MSS.

Referring to FIG. 7, a serving base station 710 transmits an MOB_NBR_ADV message to an MSS 700 (step 711). Upon receiving the MOB_NBR_ADV message from the serving base station 710, the MSS 700 obtains information relating to the neighbor base stations and transmits an MOB_SCN_REQ message to the serving base station 710 if it is necessary to scan the CINRs of pilot channels signals transmitted from the neighbor base stations (step 713). A scan request time of the MSS 700 for scanning the CINRs of the pilot channel signals transmitted from the neighbor base stations does not directly relate to the CINR scanning operation, so it will not be further described below. The serving base station 710 receiving the MOB_SCN_REQ message transmits an MOB_SCN_RSP message including the scanning information, which must be scanned by the MSS 700, to the MSS 700 (step 715). Upon receiving the MOB_SCN_RSP message including the scanning information from the serving base station 710, the MSS 700 scans the parameters included in the MOB_SCN_RSP message, that is, the MSS 700 scans the CINRs of the pilot channel signals of the neighbor base stations obtained through the MOB_NBR_ADV message (step 717). Although a process for measuring the CINR signal of the pilot channel signal transmitted from the serving base station 710 is not separately illustrated in FIG. 7, the MSS 700 may continuously measure the CINR of the pilot channel signal transmitted from the serving base station 710.

When the serving base station 710 determines that it is necessary to perform the handover of the MSS 700 managed by the serving base station 710 (step 719), the serving base station 710 transmits an HO_notification message to the neighbor base stations (steps 721 and 723). Herein, the HO_notification message includes information relating to a bandwidth and a service level which must be provided from a target base station, that is, a new serving base station of the MSS 700. In FIG. 7, the neighbor base stations of the serving base station 710 are first and second target base stations. 720 and 730.

Upon receiving the HO_notification message, the first and second target base stations 720 and 720 transmit the HO_notification response message to the serving base station 710 in response to the HO_notification message (step 725 and 727). As described with reference to Table 12, the HO_notification response message includes ACK/NACK representing a response of the target base stations, that is, a response of the neighbor base stations with regard to the handover requested by the serving base station 710, and information about a bandwidth and a service level of the target base stations, which must be provided to the MSS 700.

The serving base station 710 receives the HO_notification response message from the first and second target base stations 720 and 730 and selects the target base stations capable of providing an optimal bandwidth and an optimal service level to the MSS 700. For instance, if the service level provided from the first target base station 720 is less than the service level requested by the MSS 700 and the service level provided from the second target base station 730 is identical to the service level requested by the MSS 700, the serving base station 710 selects the second target base station 730 as a final target base station performing a handover operation in relation to the MSS 700. Thus, the serving base station 710 selecting the second target base station 730 as a final target base station transmits an HO_notification conform message to the second target base station 730 in response to the HO_notification response message (step 729).

The serving base station 710 transmits the MOB_HO_RSP message to the MSS 700 (step 731) after transmitting the HO_notification conform message to the second target base station 730. The MOB_HO_RSP message includes N_Recommended information selected by the serving base station 710, that is, information related to the bandwidth and the service level which must be provided to the MSS 700 from the selected target base stations (the second target base station 730 in FIG. 7) and target base stations. Upon receiving the MOB_HO_RSP message, the MSS 700 recognizes that the handover is requested by the serving base station 710 so that the MSS 700 selects the final target base station performing the handover operation in relation to the MSS 700 based on N_Recommended information included in the MOB_HO_RSP message. After that, the MSS 700 transmits the MOB_HO_IND message to the serving station 710 in response to the MOB_HO_RSP message (step 733). As the MOB_HO_IND message is received in the serving base station 710, the serving base station 710 recognizes that the MSS 700 will be handed-over to the target base station based on the MOB_HO_IND message so that the serving base station 710 releases a link connecting the serving base station to the MSS 700 (step 735). If the link connecting the MSS 700 to the serving base station 710 has been released, the MSS 700 is handed-over to the second target base station 730.

As described above, according to the conventional IEEE 802.16e communication system, the MSS is handed-over to the neighbor base station. The MSS is handed-over to the target base station, which is different from the serving base station, when the CINR of the pilot cannel signal of the serving base station becomes reduced so that it is impossible for the MSS to properly communicate with the serving base station, or when the handover is requested by the MSS or the serving base station. However, if an MSS drop occurs during the handover operation in the conventional IEEE 802.16e communication system, the MSS monitors all of the frequency bands in a similar way as to the operation of the MSS after the MSS is powered on in order to detect a pilot channel signal having the highest CINR and selects the base station, which has transmitted the pilot channel signal having the highest CINR, as a base station for the MSS. In addition, if an MSS drop occurs while the MSS is communicating with the serving base station in the conventional IEEE 802.16e communication system, the MSS monitors all of the frequency bands in the same manner as the MSS drop so as to detect a pilot channel signal having the highest CINR and selects the base station, which has transmitted the pilot channel signal having the highest CINR, as a base station for the MSS.

According to the above two cases, the MSS monitors all of the frequency bands although the MSS is communicating with the serving base station, requiring a relatively long period of time for selecting the serving base station, thereby lowering service quality. Therefore, it is necessary to provide an improved procedure capable of allowing the MSS subject to the drop during a communication to resume communication with a minimum time delay.

SUMMARY OF THE INVENTION

Accordingly, the present invention has been made to solve at least the above-mentioned problems occurring in the prior art, and an object of the present invention is to provide a system and a method for selecting a serving base station for an MSS when the MSS is subject to a drop during a communication in a broadband wireless communication system.

Another object of the present invention is to provide a system and a method for selecting a serving base station for an MSS when the MSS is subject to a drop during a handover operation in a broadband wireless communication system.

Still another object of the present invention is to provide a system and a method capable of allowing an MSS to primarily reestablish communication when the MSS is subject to a drop during a communication in a broadband wireless communication system.

Still another object of the present invention is to provide a system and a method for reducing the time required for an MSS to reestablish a communication link when the MSS subject to a drop reenters a network in a broadband wireless communication system.

In order to accomplish these objects, the present invention provides a system for assigning ranging codes in a broadband wireless access communication system, the system including a transmission unit for classifying rangings defined in the broadband wireless access communication system into an initial ranging, a periodic ranging, a bandwidth request ranging and a drop ranging, creating Q ranging codes used for the rangings, assigning A ranging codes selected from the Q ranging codes as drop ranging codes used for the drop ranging, and transmitting first information representing the drop ranging codes; and a receiving unit for receiving the first information transmitted from the transmission unit, and performing the drop ranging by using the drop ranging codes included in the first information.

In order to accomplish these objects, the present invention provides a system for selecting a new serving base station when a drop occurs in a mobile subscriber station in a broadband wireless access communication system including the mobile subscriber station, a serving base station communicating with the mobile subscriber station, and a plurality of neighbor base stations different from the serving base station, the system including the mobile subscriber station receiving information related to the neighbor base stations from the serving base station communicating with the mobile subscriber station, monitoring the frequency bands of the neighbor base stations included in the information about the neighbor base stations if the drop is detected in order to detect target base stations capable of serving as a new serving base station, selecting the new serving base station from the detected target base stations, and notifying the new serving base station of a reestablishment of communication caused by the drop occurring in the mobile subscriber station; and the new serving base station primarily assigning channel resources to the mobile subscriber station when the new serving base station receives a notification about the reestablishment of communication from the mobile subscriber station.

In order to accomplish these objects, the present invention provides a method of assigning ranging codes in a broadband wireless access communication system, the method including the steps of classifying rangings between a transmission unit and a receiving unit of the broadband wireless access communication system into an initial ranging, a periodic ranging, a bandwidth request ranging and a drop ranging; and creating Q of ranging codes used for the rangings and assigning A ranging codes selected from the Q ranging codes as drop ranging codes used for the drop ranging.

In order to accomplish these objects, according to a first aspect of the present invention, there is provided a method of selecting a new serving base station when a drop occurs in a mobile subscriber station in a broadband wireless access communication system including the mobile subscriber station, a serving base station making communication with the mobile subscriber station, and a plurality of neighbor base stations different from the serving base station, the method including the steps of detecting the drop based on information related to the neighbor base stations transmitted from the serving base station communicating with the mobile subscriber station; monitoring frequency bands of the neighbor base stations included in the information related to the neighbor base stations if the drop is detected; detecting target base stations capable of serving as a new serving base station for communicating with the mobile subscriber station when the drop occurs in the mobile subscriber station according to a monitoring result for the frequency bands of the neighbor base stations; and selecting the new serving base station from the detected target base stations.

In order to accomplish these objects, according to a second aspect of the present invention, there is provided a method of selecting a new serving base station when a drop occurs in a mobile subscriber station during an handover operation of the mobile subscriber station from a serving base station to a predetermined neighbor base station in a broadband wireless access communication system including the mobile subscriber station, the serving base station communicating with the mobile subscriber station, and n neighbor base stations different from the serving base station, the method including the steps of receiving information related to the n of neighbor base stations transmitted from the serving base station communicating with the mobile subscriber station and monitoring frequency bands of the n neighbor base stations included in the information about the n neighbor base stations; allowing the serving base station to determine the handover operation and detecting a m neighbor base stations ($m \leq n$) capable of serving as new serving station according to a monitoring result for the frequency bands of the n neighbor base stations; sending a signal requesting a handover to the serving base station based on information related to the m neighbor base stations; monitoring frequency bands of the m of neighbor base stations if the drop occurs after requesting the handover; detecting target base stations capable of serving as a new serving station according to a monitoring result for the frequency bands of the m neighbor base stations; and selecting the new serving station from the detected target base stations.

In order to accomplish these objects, according to a third aspect of the present invention, there is provided a method of selecting a new serving base station when a drop occurs in a mobile subscriber station during an handover operation of the mobile subscriber station from a serving base station to a neighbor base station in a broadband wireless access communication system including the mobile subscriber station, the serving base station communicating with the mobile subscriber station, and n neighbor base stations different from the serving base station, the method including the steps of receiving information relating to the neighbor base stations transmitted from the serving base station making communication with the mobile subscriber station and monitoring frequency bands of the neighbor base stations included in the information related to the neighbor base stations; monitoring each frequency band of neighbor base stations if the drop is detected after monitoring frequency bands of the neighbor base stations; detecting target base stations capable of serving as a new serving station according to a monitoring result for each frequency band of neighbor base stations; and selecting the new serving station from the detected target base stations.

In order to accomplish these objects, according to a fourth aspect of the present invention, there is provided a method of selecting a new serving base station when a drop occurs in a mobile subscriber station during an handover operation of the mobile subscriber station from a serving base station to a neighbor base station in a broadband wireless access communication system including the mobile subscriber station, the serving base station communicating with the mobile subscriber station, and n neighbor base stations different from the serving base station, the method including the steps of receiving information relating to the n neighbor base stations transmitted from the serving base station communicating with the mobile subscriber station and monitoring frequency bands of the n neighbor base stations included in the information related to the n neighbor base stations; determining by the serving base station the handover operation and detecting a m neighbor base stations (m≦n) capable of serving as a new serving station according to a monitoring result for the frequency bands of the n neighbor base stations; sending a signal requesting a handover to the serving base station based on information related to the m neighbor base stations; receiving a handover response including information related to a k recommended neighbor base stations (k≦m), to which the mobile subscriber station is handed-over from the serving base station, according to a request for the handover; monitoring frequency bands of the k recommended neighbor base stations if the drop occurs after the request for the handover; detecting target base stations capable of serving as a new serving station according to a monitoring result for the frequency bands of the k recommended neighbor base stations; and selecting the new serving station from the detected target base stations.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, embodiments of the present invention will be described with reference to the accompanying drawings. In the following detailed description, representative embodiments of the present invention will be described. In addition, a detailed description of known functions and configurations incorporated herein will be omitted when it may obscure the subject matter of the present invention.

The present invention provides a method for selecting a serving base station when an mobile subscriber station ("MSS") is subject to a drop during a communication in an IEEE (Institute of Electrical and Electronics Engineers) 802.16e communication system, a broadband wireless access communication system. In the following description, the expression "an MSS is subject to a drop" and "a drop occurs in an MSS" are used to describe a call drop. According to the present invention, the MSS may instantly select a serving base station (BS) when the MSS is subject to the drop during a communication, so that the MSS can reestablish the communication with regard to the serving base station within a short period of time. In addition, the present invention provides a method for assigning a ranging code, that is, a drop ranging code in order to minimize the time required for network re-entry of the MSS when the MSS is subject to the drop in the IEEE 802.16e communication system.

The IEEE 802.16e communication system is a broadband wireless access communication system utilizing an orthogonal frequency division multiplexing ("OFDM") scheme and an orthogonal frequency division multiple access ("OFDMA") scheme. Since the IEEE 802.16e communication system uses the OFDM/OFDMA schemes, the physical channel signals can be transmitted through a plurality of sub-carriers so that a high-speed data transmission is possible. In short, the IEEE 802.16e communication system is a broadband wireless access communication system capable of providing for the mobility of the MSS by using a multi-cell structure.

The drop signifies that the MSS is disconnected from the serving base station during a communication. The drop is a release of a link connecting the MSS to the serving base station, that is, a call release. The present invention has been made under the assumption that the drop occurs in the MSS after the MSS has received a mobile neighbor advertisement ("MOB_NBR_ADV") message. If the drop occurs in the MSS, a periodic ranging cannot be normally carried out between the MSS and the serving base station. As described above in relation to the prior art, the periodic ranging is periodically carried out by means of the MSS having a time offset and its transmit power adjusted through an initial ranging, in such a manner that the MSS can adjust a channel status with respect to the base station.

A process for detecting a drop by means of an MSS using a periodic ranging procedure will be described with reference to FIG. 8.

Figure 1:
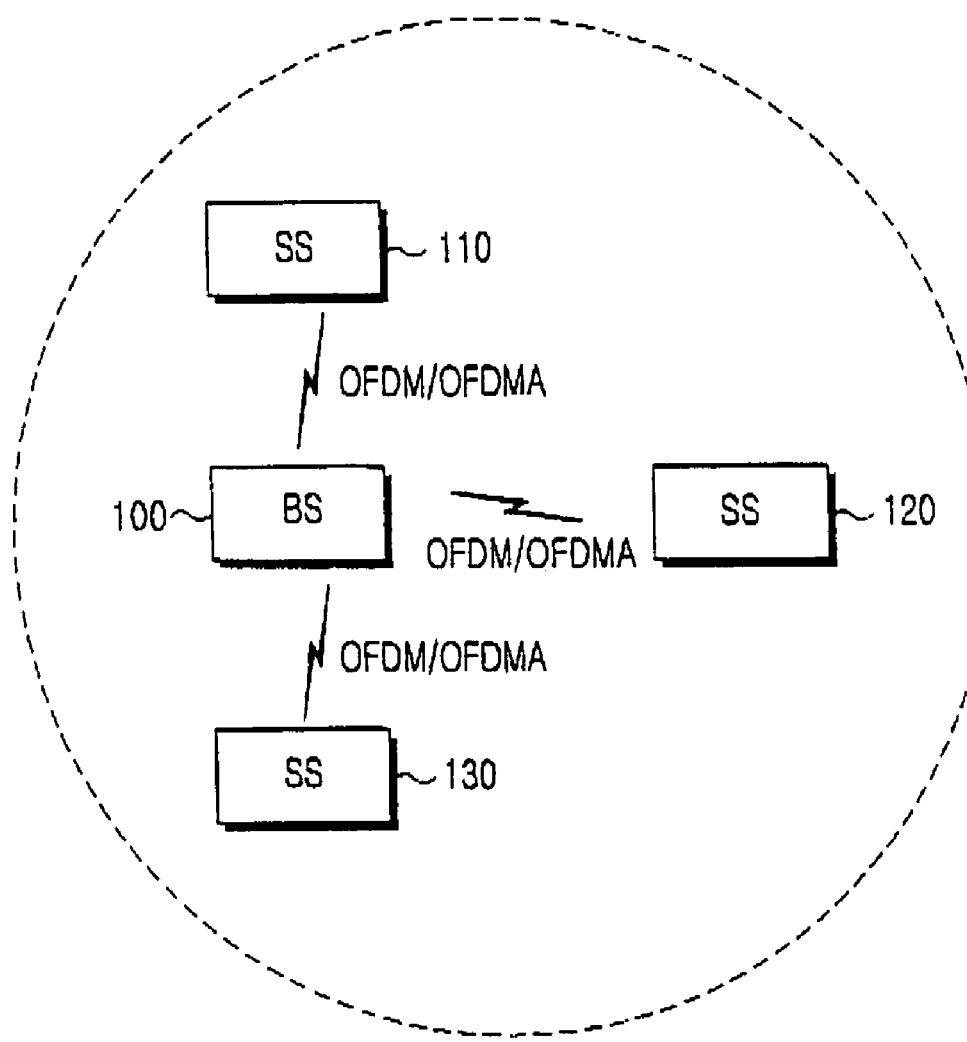
FIG. 1 is a structure diagram schematically illustrating a conventional IEEE 802.16a communication system.
Figure 2:
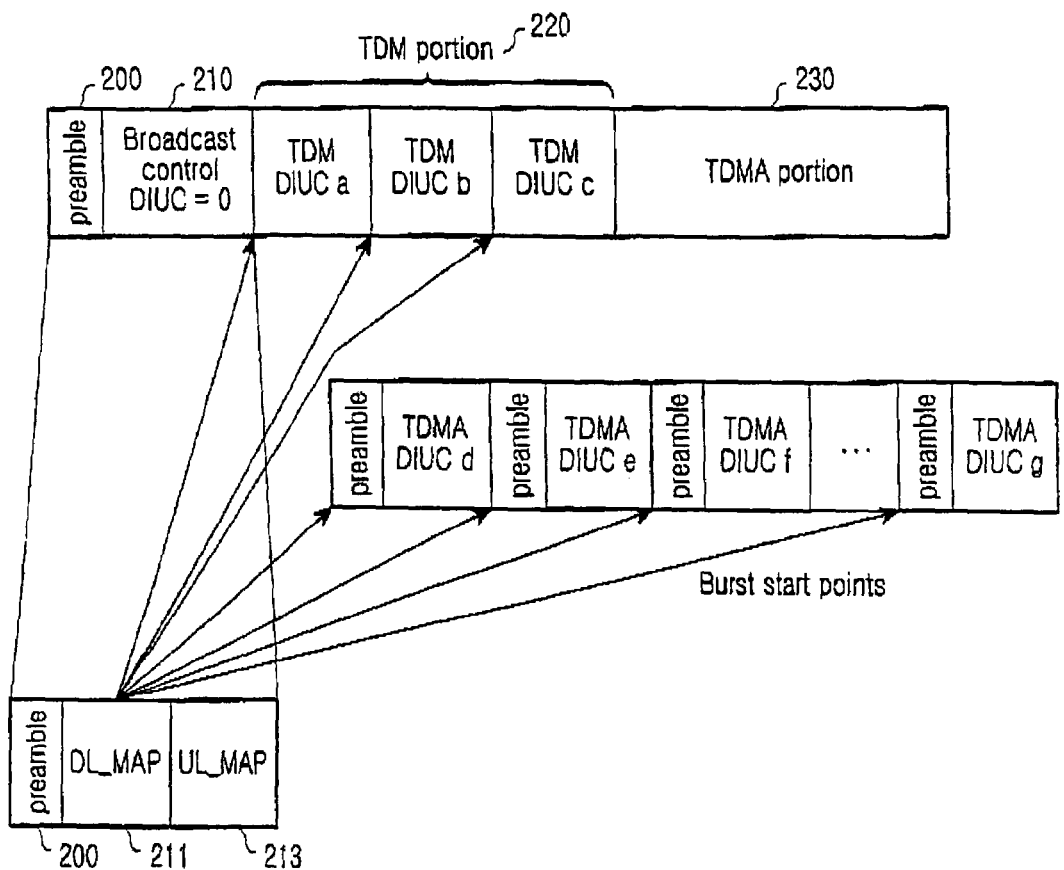
FIG. 2 is a structure diagram schematically illustrating a structure of a downlink frame of a conventional IEEE 802.16a communication system.
Figure 3:
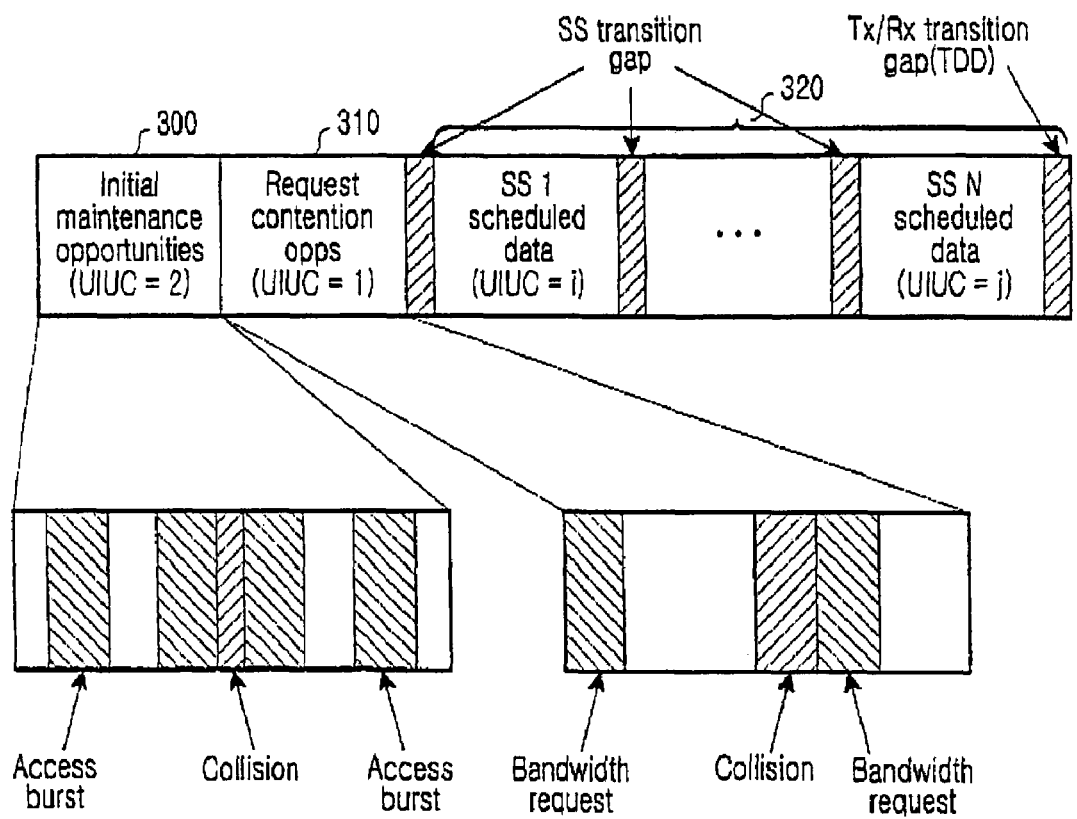
FIG. 3 is a structure diagram schematically illustrating a structure of an uplink frame of a conventional IEEE 802.16a communication system.
Figure 4:
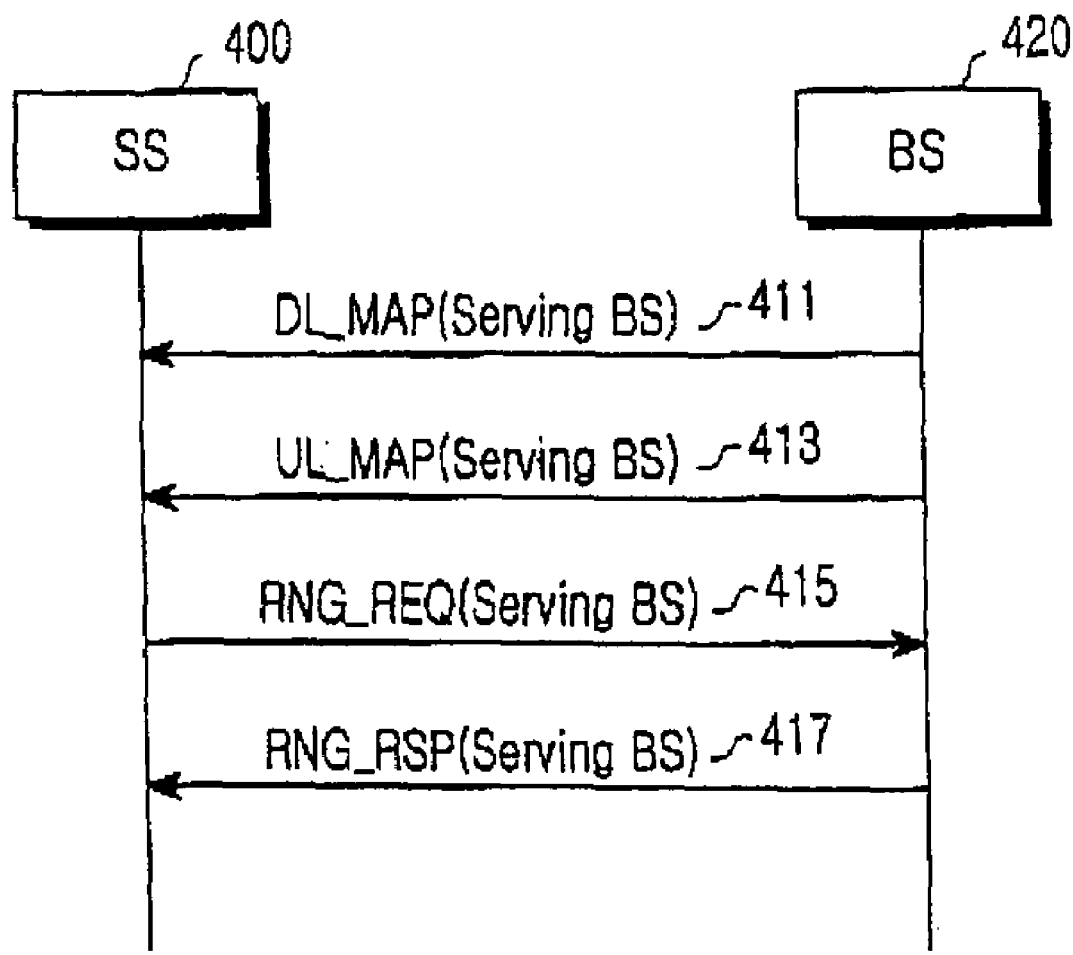
FIG. 4 is a signal flow diagram illustrating a ranging process between a base station and an SS in a conventional IEEE 802.16a communication system.
Figure 5:
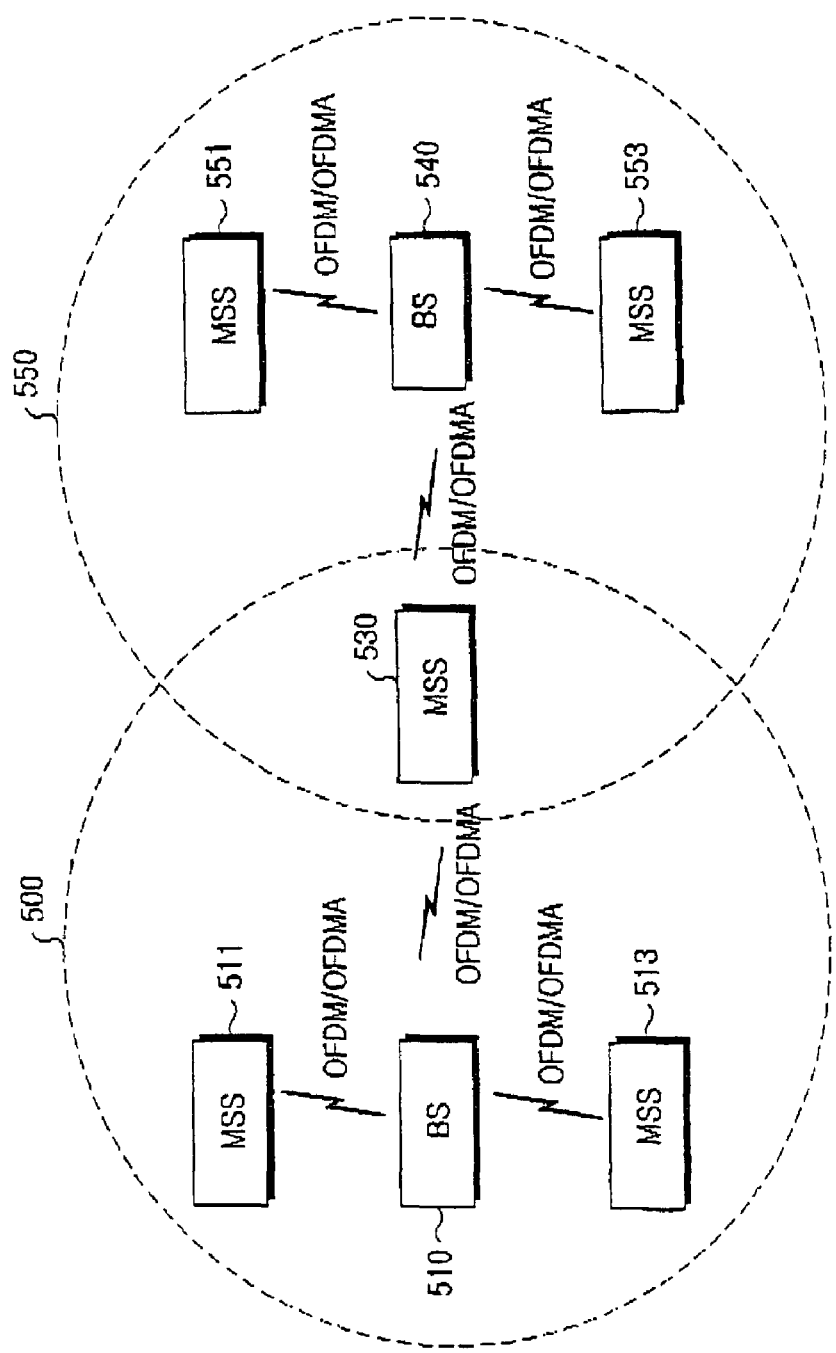
FIG. 5 is a structure diagram schematically illustrating a structure of a conventional IEEE 802.16e communication system.
Figure 6:
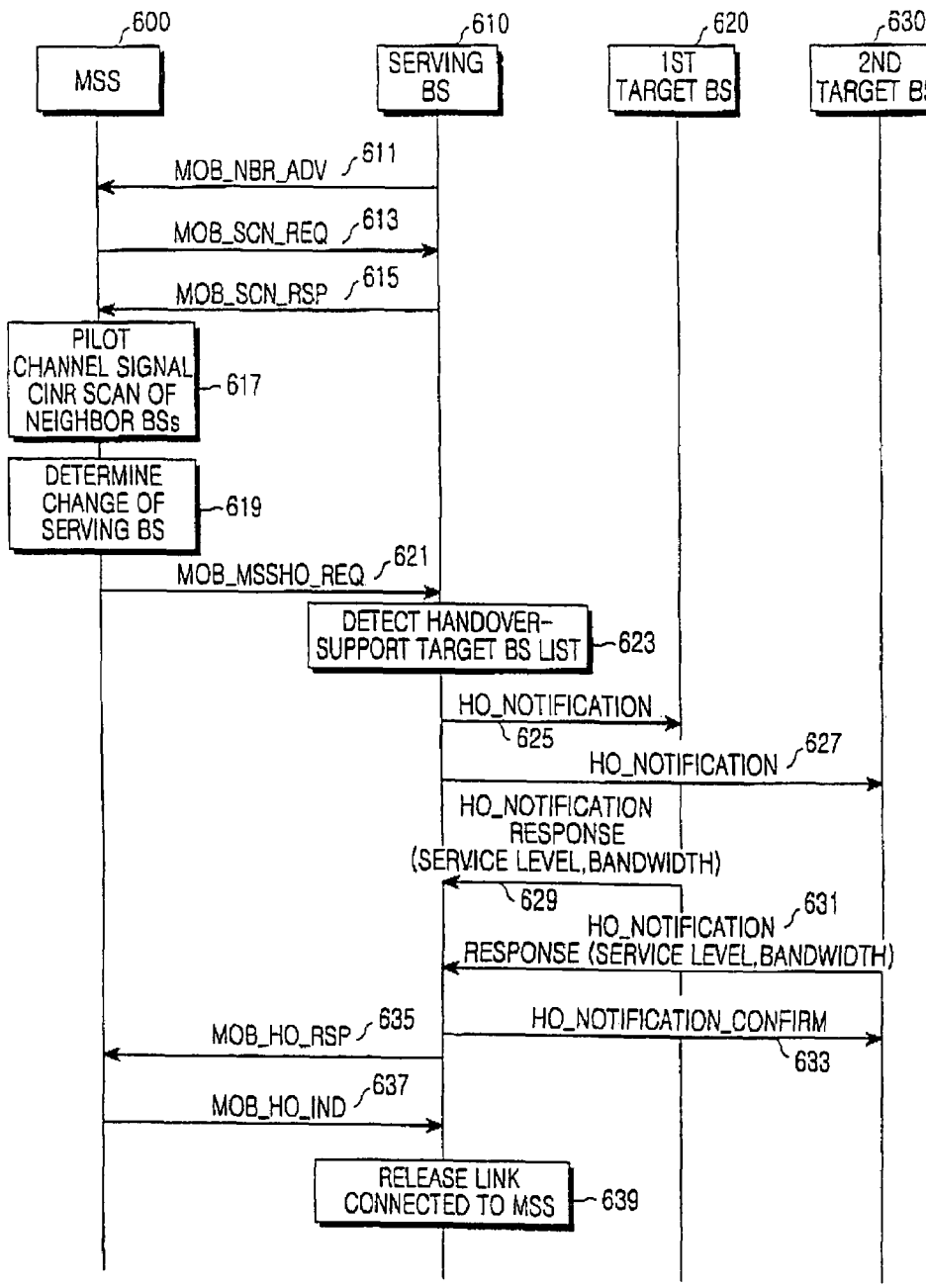
FIG. 6 is a signal flow diagram illustrating a handover process according to a request of an MSS in a conventional IEEE 802.16e communication system.
Figure 7:
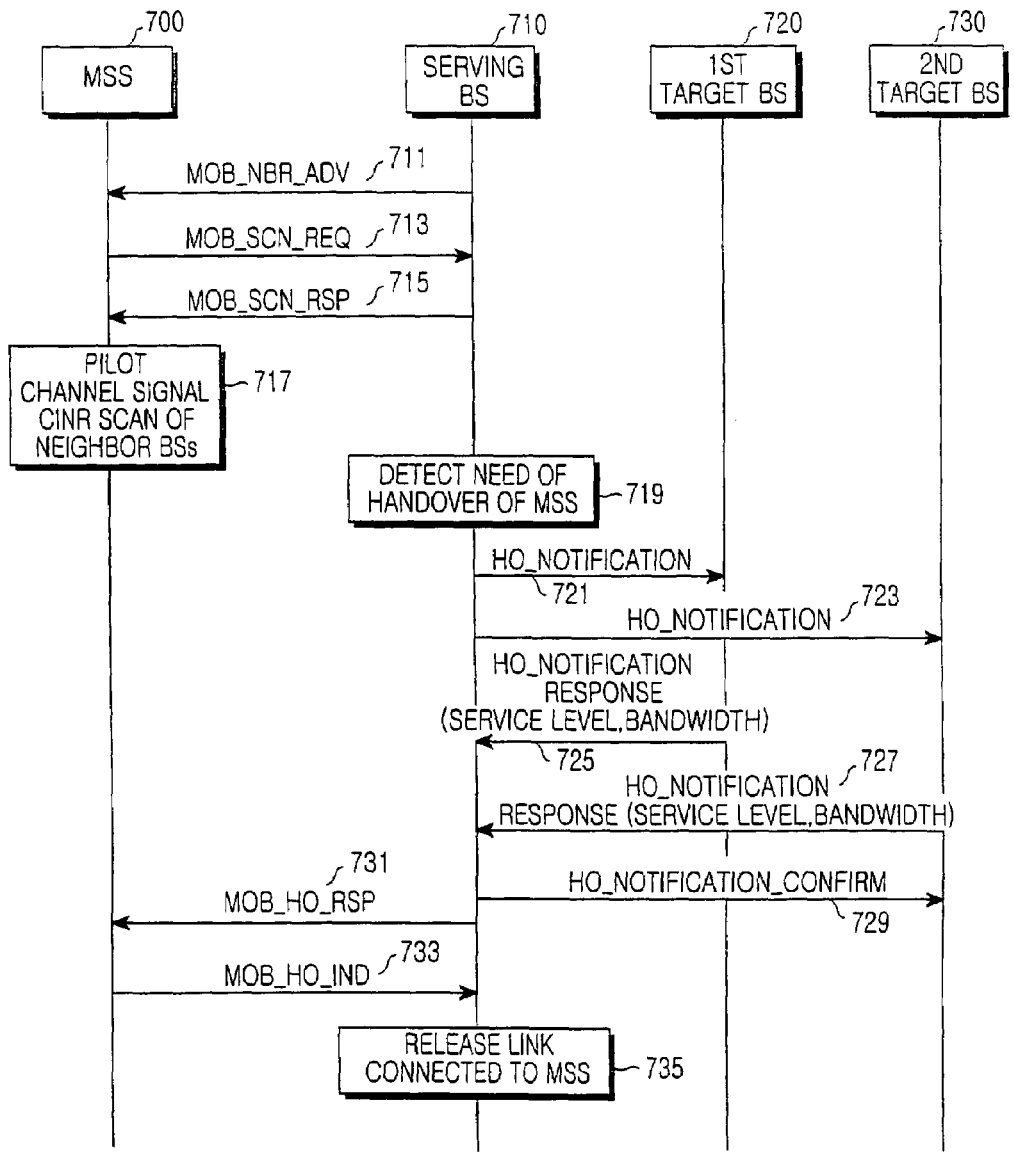
FIG. 7 is a signal flow diagram illustrating a handover process according to a request of a base station in a conventional IEEE 802.16e communication system.
Figure 8:
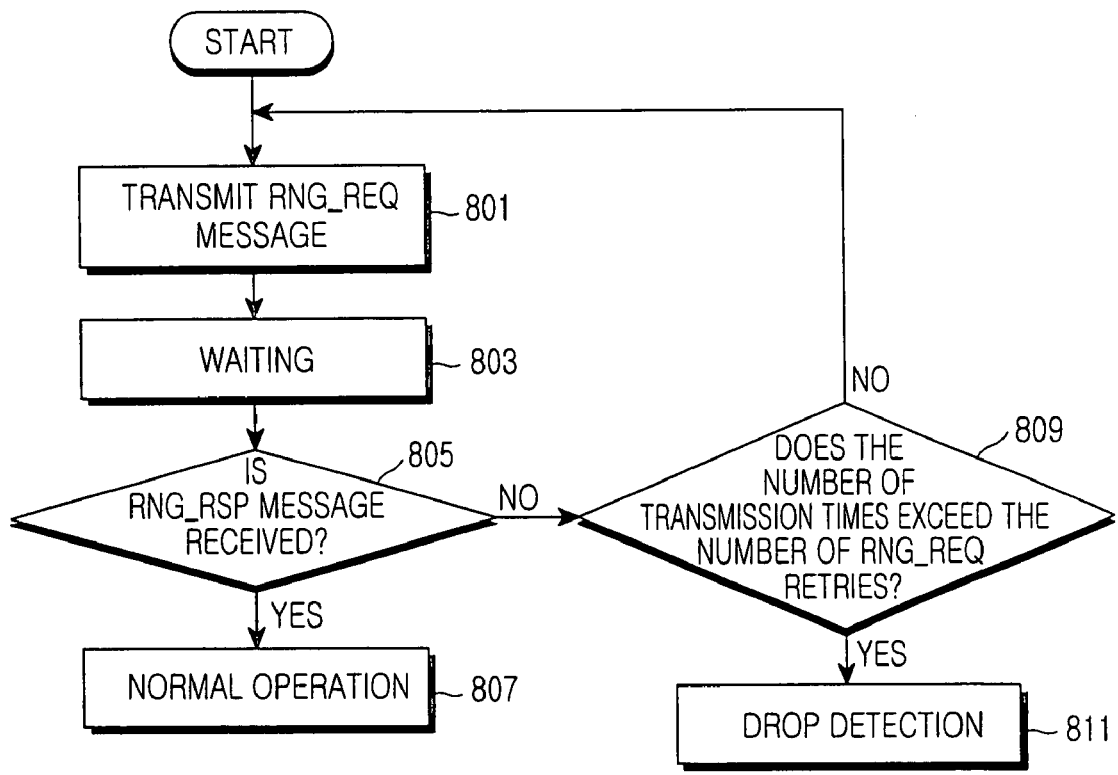
FIG. 8 is a flowchart illustrating a process for detecting a drop by means of an MSS using a periodic ranging procedure in an IEEE 802.16e communication system according to one embodiment of the present invention.

FIG. 8 is a flowchart illustrating the process for detecting the drop by means of the MSS using the periodic ranging procedure in an IEEE 802.16e communication system according to one embodiment of the present invention.

Referring to FIG. 8, the MSS that obtains an initial synchronization with respect to the serving base station transmits a ranging request ("RNG_REQ") message to the serving base station (step 801). A configuration of the RNG_REQ message is identical to the configuration of the RNG_REQ message, which has been described with reference to Table 5, so it will not be further described below. In step 803, the MSS waits for a ranging response ("RNG_RSP") message, which is a response message to the RNG_REQ message. A configuration of the RNG_RSP message is identical to the configuration of the RNG_RSP message, which has been described with reference to Table 6, so it will not be further described below. In step 805, the MSS determines whether or not the RNG_RSP message is transmitted thereto from the serving base station. If the RNG_RSP message is transmitted to the MSS from the serving base station, the procedure goes to step 807. In step 807, since the ranging process has been completed, the MSS is normally operated.

If the RNG_RSP message has not been transmitted to the MSS from the serving base station in step 805, the procedure goes to step 809. In step 809, the MSS determines whether or not the number of transmission times of the RNG_REQ message exceeds the number of times for the RNG_REQ RETRIES ("RNG_REQ RETRIES"). Herein, the number of times for the RNG_REQ RETRIES represents the maximum number of transmission times of the RNG_REQ message by means of the MSS in a state in which the MSS does not receive the RNG_RSP message from the base station. If it is determined that the number of transmission times of the RNG_REQ message does not exceed the number of times for the RNG_REQ RETRIES in step 809, the procedure returns to step 801. If it is determined that the number of transmission times of the RNG_REQ message exceeds the number of times for the RNG_REQ RETRIES in step 809, the procedure goes to step 811. In step 811, the MSS detects the drop occurring in the MSS.

A process for detecting a drop by means of a serving base station using a periodic ranging procedure will be described with reference to FIG. 9.

Figure 9:
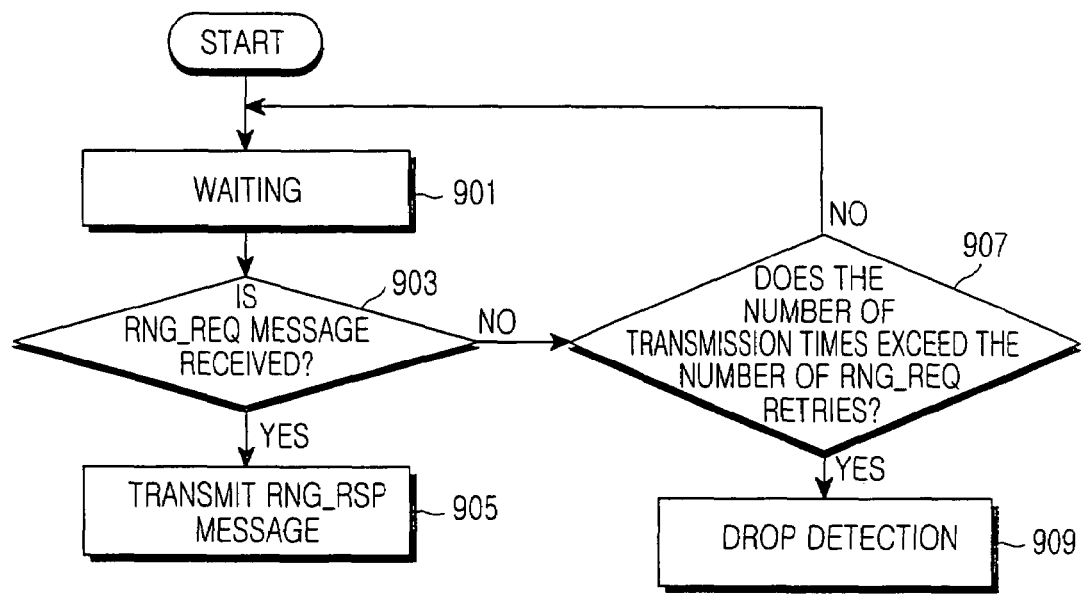
FIG. 9 is a flowchart illustrating a process for detecting a drop by means of a serving base station using a periodic ranging procedure in an IEEE 802.16e communication system according to one embodiment of the present invention.

FIG. 9 is a flowchart illustrating the process for detecting the drop by means of the serving base station using the periodic ranging procedure in an IEEE 802.16e communication system according to one embodiment of the present invention.

Referring to FIG. 9, the serving base station that obtains an initial synchronization with respect to the MSS waits for RNG_REQ message transmitted from the MSS (step 901). In step 903, the serving base station determines whether or not the RNG_REQ message is transmitted thereto from the MSS. If the RNG_REQ message is transmitted to the serving base station from the MSS, the procedure goes to step 905. In step 905, the serving base station transmits the RNG_RSP message to the MSS in response to the RNG_REQ message.

If the RNG_REQ message has not been transmitted to the serving base station from the MSS in step 903, the procedure goes to step 907. In step 907, the serving base station determines whether or not the number of transmission times of the RNG_REQ message exceeds the number of times for the RNG_REQ RETRIES. Herein, the serving base station may increase the number of transmission times for the RNG_REQ message by 1 if the serving base station does not receive the RNG_REQ message within a predetermined time (RNG_REQ_Timeout). If it is determined that the number of transmission times of the RNG_REQ message does not exceed the number of times for the RNG_REQ RETRIES in step 907, the procedure returns to step 901. If it is determined that the number of transmission times of the RNG_REQ message exceeds the number of times for the RNG_REQ RETRIES in step 907, the procedure goes to step 909. In step 909, the serving base station detects the drop occurring in the MSS. Accordingly, in the same manner as the normal handover procedure, the serving base station releases a link, that is, releases a call with regard to the MSS which is subject to the drop.

A process for detecting a drop by using a downlink status will be described with reference to FIG. 10.

Figure 10:
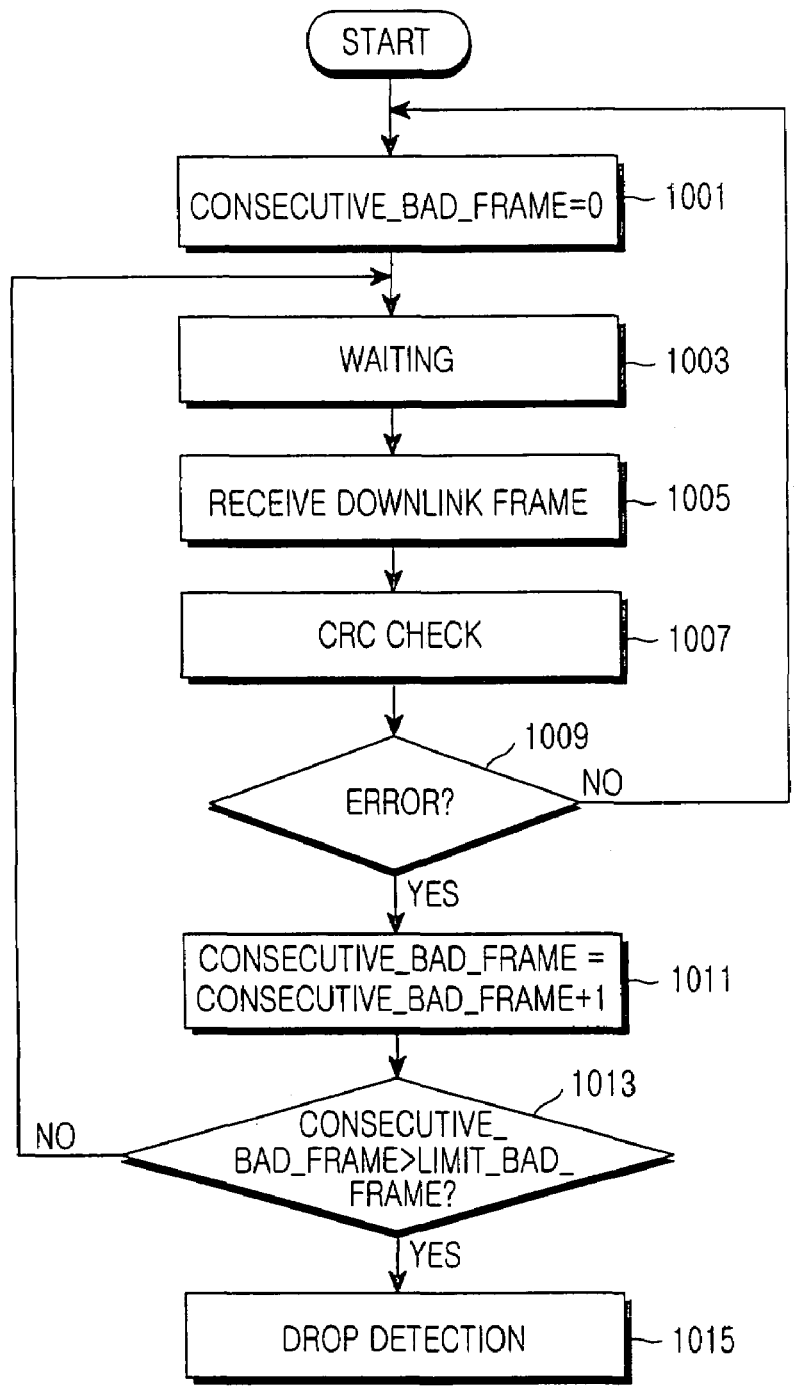
FIG. 10 is a flowchart illustrating a process for detecting a drop by means of an MSS using a downlink status in an IEEE 802.16e communication system according to one embodiment of the present invention.

FIG. 10 is a flowchart illustrating the process for detecting the drop by means of an MSS using the downlink status in an IEEE 802.16e communication system according to one embodiment of the present invention.

Referring to FIG. 10, the MSS initializes a value of CONSECUTIVE_BAD_FRAME, which is a parameter for counting the number of frames having inferior quality ("bad frame"), as "0" (CONSECUTIVE_BAD_FRAME=0) (step 1001). The bad frame signifies a frame having inferior quality which cannot be used for data communication even if errors created in the frame have been corrected. In step 1003, the MSS remains in a waiting state. In step 1005, the MSS receives the downlink frame. In step 1007, the MSS performs a cyclic redundancy check (CRC) with respect to the received downlink frame. In step 1009, the MSS determines whether or not an error occurs in the downlink frame.

If it is determined that the error is not generated from the downlink frame in step 1009, the procedure returns to step 1001. If it is determined that the error is generated from the downlink frame in step 1009, the procedure goes to step 1011. In step 1011, the MSS determines that the received downlink frame is a bad frame, so the MSS increase the value of the CONSECUTIVE_BAD_FRAME by 1 (CONSECUTIVE_BAD_FRAME=CONSECUTIVE_BAD_FRAME+1). In step 1013, the MSS determines whether or not the value of the CONSECUTIVE_BAD_FRAME exceeds a predetermined limit number of bad frames ("LIMIT_BAD_FRAME"). If it is determined that the value of the CONSECUTIVE_BAD_FRAME does not exceed the LIMIT_BAD_FRAME in step 1013, the procedure returns to step 1003. If it is determined that the value of the CONSECUTIVE_BAD_FRAME exceeds the LIMIT_BAD_FRAME in step 1013, the procedure goes to step 1015. In step 1015, the MSS detects the drop occurring the MSS.

As described with reference to FIGS. 8 to 10, since the link connecting the MSS to the serving base station may be released if the MSS is subject to the drop, the MSS must search the serving base stations in order to reestablish a communication with regard to a new serving base station. According to the prior art, the MSS detecting the drop must monitor all of the frequency bands in the similar way as to the operation of the MSS after the MSS is powered on in order to detect a reference channel, that is, a pilot channel signal having a highest CINR and selects the base station, which has transmitted the pilot channel signal having the highest CINR, as a target base station for the MSS. The MSS also receives a preamble of the downlink frame transmitted from the target base station and obtains a system synchronization with respect to the target base station, thereby selecting the target base station as a new serving base station. A new serving base station different from the present serving base station of the MSS, that is, a serving station capable of performing the handover operation with regard to the MSS, becomes the target station. According to the present invention, the drop may occur in the MSS during a communication after the MSS has received the MOB_NBR_ADV message, so it is not necessary to carry out the step of monitor all of the frequency bands preset in the MSS in the similar way as the operation of the MSS after the MSS is powered in order to detect the pilot channel signal having a highest CINR for selecting the serving base station based on the pilot channel signal. According to the present invention, the new serving base station is selected from among target base stations capable of serving as a new serving base station when the drop occurs in the MSS, thereby minimizing a communication delay.

According to the present invention, the MSS which is subject to the drop during communication after receiving the MOB_NBR_ADV message may select the serving base station in a different way as compared with the MSS which is subject to the drop during the handover operation. For this reason, a procedure of the MSS for selecting the serving base station will be described below by considering the two, cases of the MSS, that is, a non-handover state of the MSS and a handover state of the MSS.

Figure 11:
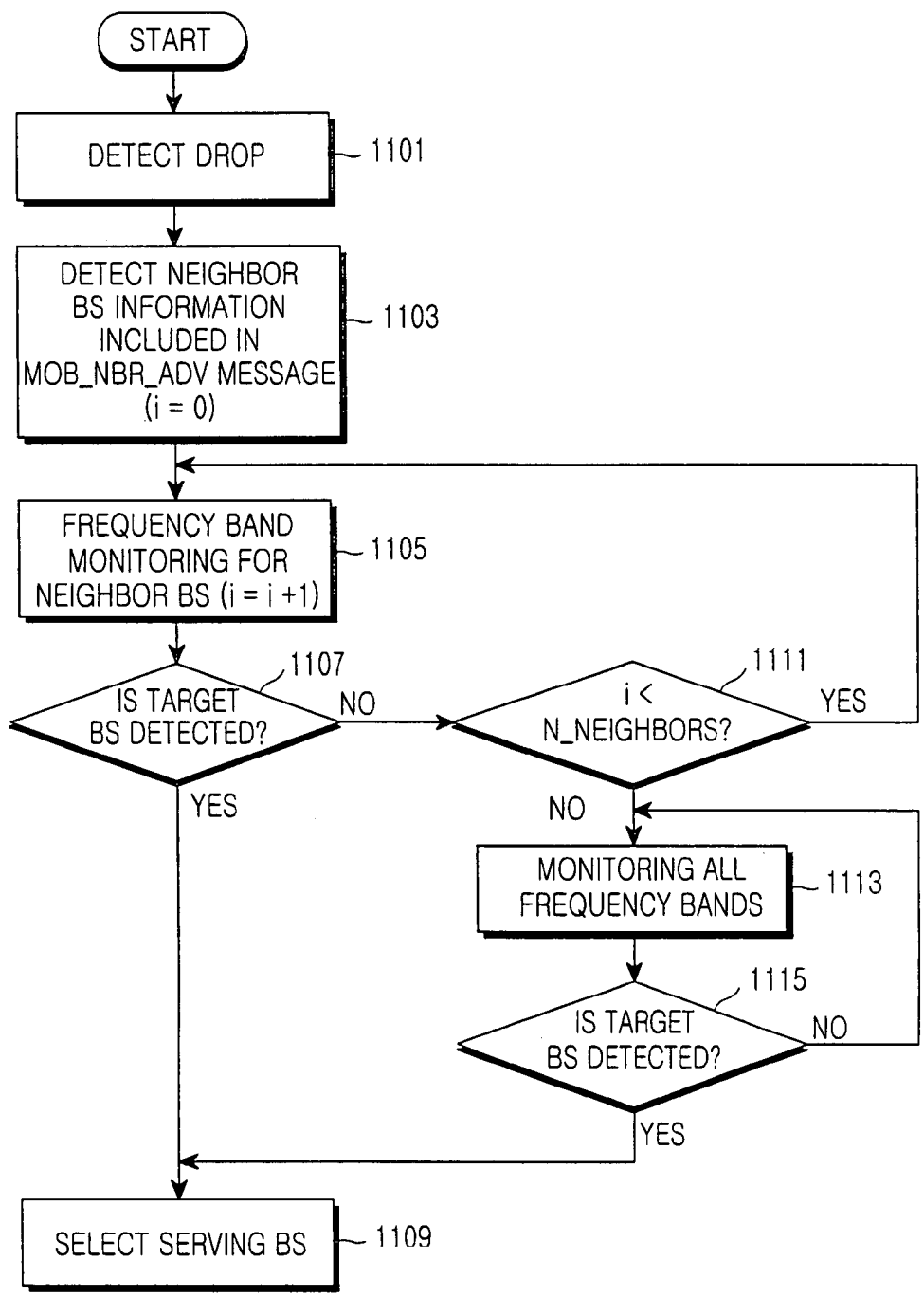
FIG. 11 is a flowchart illustrating a procedure for selecting a serving base station when a drop occurs during a non-handover state in an IEEE 802.16e communication system according to one embodiment of the present invention.

FIG. 11 is a flowchart illustrating a procedure for selecting a serving base station when a drop occurs during a non-handover state of an MSS in an IEEE 802.16e communication system according to one embodiment of the present invention.

Referring to FIG. 11, the MSS detects the drop occurring in the MSS in step 1101. In step 1103, the MSS detects information related to neighbor base stations included in the MOB_NBR_ADV message, which has been transmitted to the MSS from the serving base station before the drop occurs in the MSS, and sets a parameter i, used for monitoring the frequency bands of the neighbor base stations, to "0" (i=0). A configuration of the MOB_NBR_ADV message is identical to the configuration of the MOB_NBR_ADV message, which has been described with reference to Table 7, and the information relating to the neighbor base stations includes the number of the neighbor base stations, identifiers of the neighbor base stations, and a physical channel frequency. In addition, the parameter i represents the number of neighbor-base stations subject to the frequency band monitoring. In step 1105, the MSS sequentially selects the information about the neighbor base stations one by one (i=i+1) in order to monitor the frequency bands of the neighbor base stations.

In step 1107, the MSS determines whether or not the target base station is detected through the frequency band monitoring for the neighbor base stations. As mentioned above, the target base station signifies a base station capable of serving as a new serving base station of the MSS. For instance, a base station providing a pilot channel signal having a CINR higher than a predetermined CINR can be selected as a target base station. If it is determined that the target base station is not detected through the frequency band monitoring for the neighbor base stations in step 1107, the procedure goes to step 1111. In step 1111, the MSS determines whether or not the parameter i representing the number of neighbor base stations subject to the frequency band monitoring is less than the number of neighbor base stations (N_NEIGHBORS) included in the MOB_NBR_ADV message. If it is determined that the parameter i representing the number of neighbor base stations subject to the frequency band monitoring is less than the N_NEIGHBORS in step 1111, the procedure returns to step 1105.

If it is determined that the parameter i representing the number of neighbor base stations subject to the frequency band monitoring is not less than the N_NEIGHBORS in step 1111, the procedure goes to step 1113. In step 1113, since the MSS fails to select the target base station from among the neighbor base stations, the MSS monitors all of the frequency bands preset in the MSS. In step 1115, the MSS determines whether or not the target base station is detected. If it is determined that the target base station is not detected in step 1115, the procedure returns to step 1113. If it is determined that the target base station is detected in step 1115, the procedure goes to step 1109.

If it is determined that the target base station is detected through the frequency band monitoring for the neighbor base stations in step 1107, the procedure goes to step 1109. In step 1109, the MSS selects one target base station from among the detected target base stations as a new serving base station for the MSS. If a plurality of target base stations are detected through step 1107, the MSS selects one target base station as a new serving base station for the MSS based on the value of the CINR.

A procedure for selecting a serving base station when a drop occurs in an MSS after the MSS has transmitted an MOB_MSSHO_REQ message while a handover operation is being carried out at the request of the MSS in an IEEE 802.16e communication system will be described with reference to FIG. 12.

Figure 12:
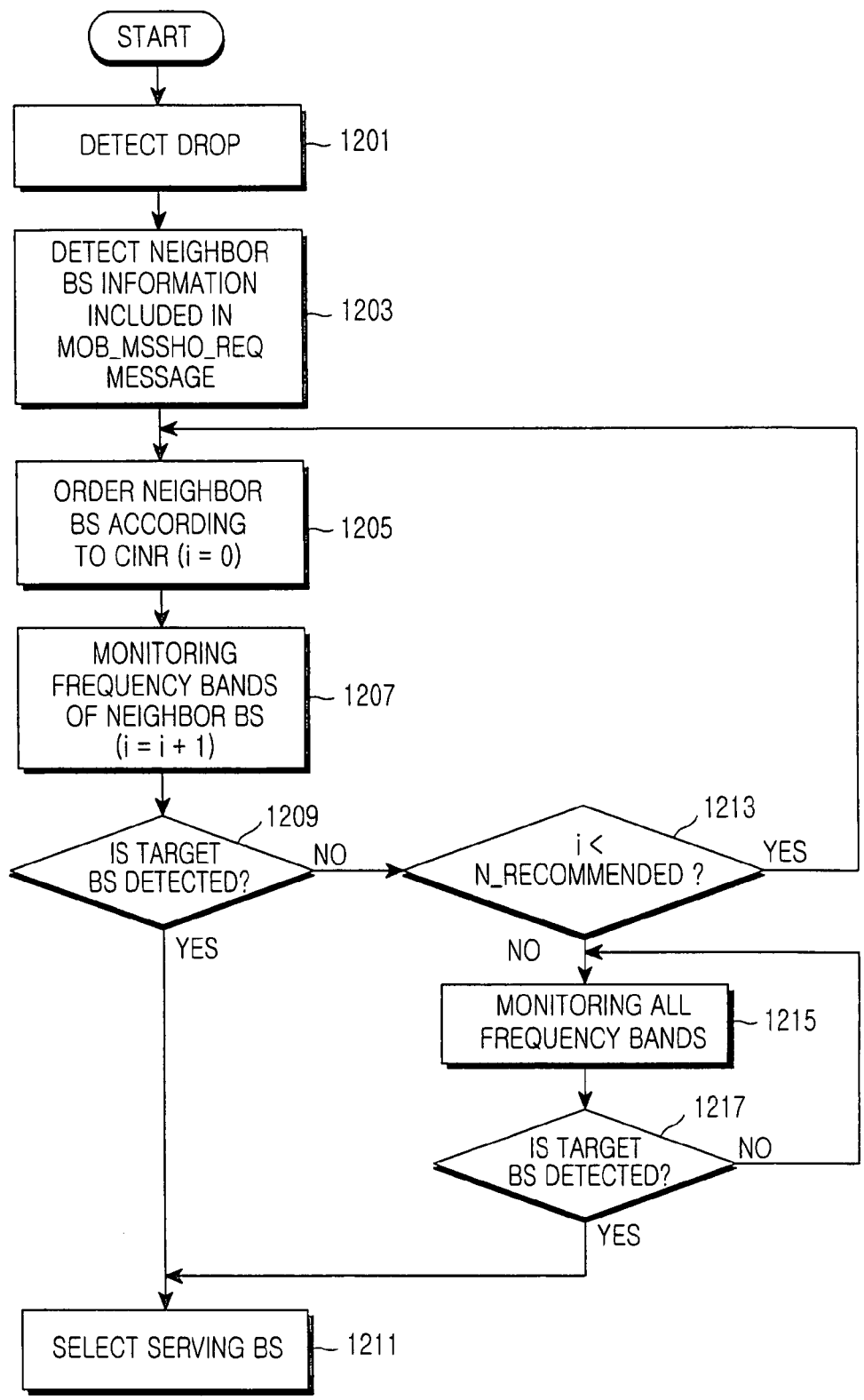
FIG. 12 is a flowchart illustrating a procedure for selecting a serving base station when a drop occurs after an MSS has transmitted an MOB_MSSHO_REQ message while a handover operation is being carried out at a request of an MSS in an IEEE 802.16e communication system according to one embodiment of the present invention.

FIG. 12 is a flowchart illustrating the procedure for selecting the serving base station when the drop occurs in the MSS after an MSS has transmitted an MOB_MSSHO_REQ message while the handover operation is being carried out at the request of the MSS in an IEEE 802.16e communication system according to one embodiment of the present invention.

Referring to FIG. 12, the MSS detects the drop occurring in the MSS in step 1201. In step 1203, the MSS detects information related to neighbor base stations included in the MOB_MSSHO_REQ message, which has been transmitted to the serving base station before the drop occurs in the MSS. Information related to the neighbor base stations included in the MOB_MSSHO_REQ message is information relating to N_RECOMMENDED, which represents the number of base stations transmitting to the MSS the pilot channel signal having a CINR greater than a predetermined CINR, obtained by scanning the CINRs of the pilot channel signals transmitted from N_NEIGHBORS included in the MOB_NBR_ADV message. That is, the information relating to the neighbor base stations included in the MOB_MSSHO_REQ message is information relating to the neighbor base stations capable of serving as a target base station for the MSS, which are selected from among N_NEIGHBORS included in the MOB_NBR_ADV message.

In step 1205, the MSS sequentially orders the detected neighbor base stations according to the value of the CINR and sets a parameter i, used for monitoring the frequency bands of the neighbor base stations, to "0" (i=0). The parameter i represents the number of neighbor base stations subject to the frequency band monitoring. In step 1207, the MSS sequentially selects the information related to the neighbor base stations one by one (i=i+1) in the order of the CINR value of the neighbor base stations in order to monitor the frequency bands of the neighbor base stations.

In step 1209, the MSS determines whether or not the target base station is detected through the frequency band monitoring for the neighbor base stations. The target base station is a base station capable of serving as a new serving base station of the MSS. For instance, a base station providing a pilot channel signal having a CINR greater than a predetermined CINR can be selected as a target base station. If it is determined that the target base station is not detected through the frequency band monitoring for the neighbor base stations in step 1209, the procedure goes to step 1213. In step 1213, the MSS determines whether or not the parameter i representing the number of neighbor base stations subject to the frequency band monitoring is less than the number of neighbor base stations (N_RECOMMENDED) included in the MOB_MSSHO_REQ message. If it is determined that the parameter i representing the number of neighbor base stations subject to the frequency band monitoring is less than the N_RECOMMENDED included in the MOB_MSSHO_REQ message in step 1213, the procedure returns to step 1207.

If it is determined in step 1213 that the parameter i representing the number of neighbor base stations subject to the frequency band monitoring exceeds the N_RECOMMENDED, the procedure goes to step 1215. In step 1215, since the MSS fails to select the target base station from among the neighbor base stations, the MSS monitors all of the frequency bands preset in the MSS. In step 1217, the MSS determines whether or not the target base station is detected. If it is determined that the target base station is not detected in step 1217, the procedure returns to step 1215. If it is determined that the target base station is detected in step 1217, the procedure goes to step 1211.

If it is determined that the target base station is detected through the frequency band monitoring for the neighbor base stations in step 1209, the procedure goes to step 1211. In step 1211, the MSS selects one target base station from among the detected target base stations as a new serving base station for the MSS. If a plurality of target base stations are detected through step 1209, the MSS selects one target base station as a new serving base station for the MSS based on the value of the CINR.

Figure 13:
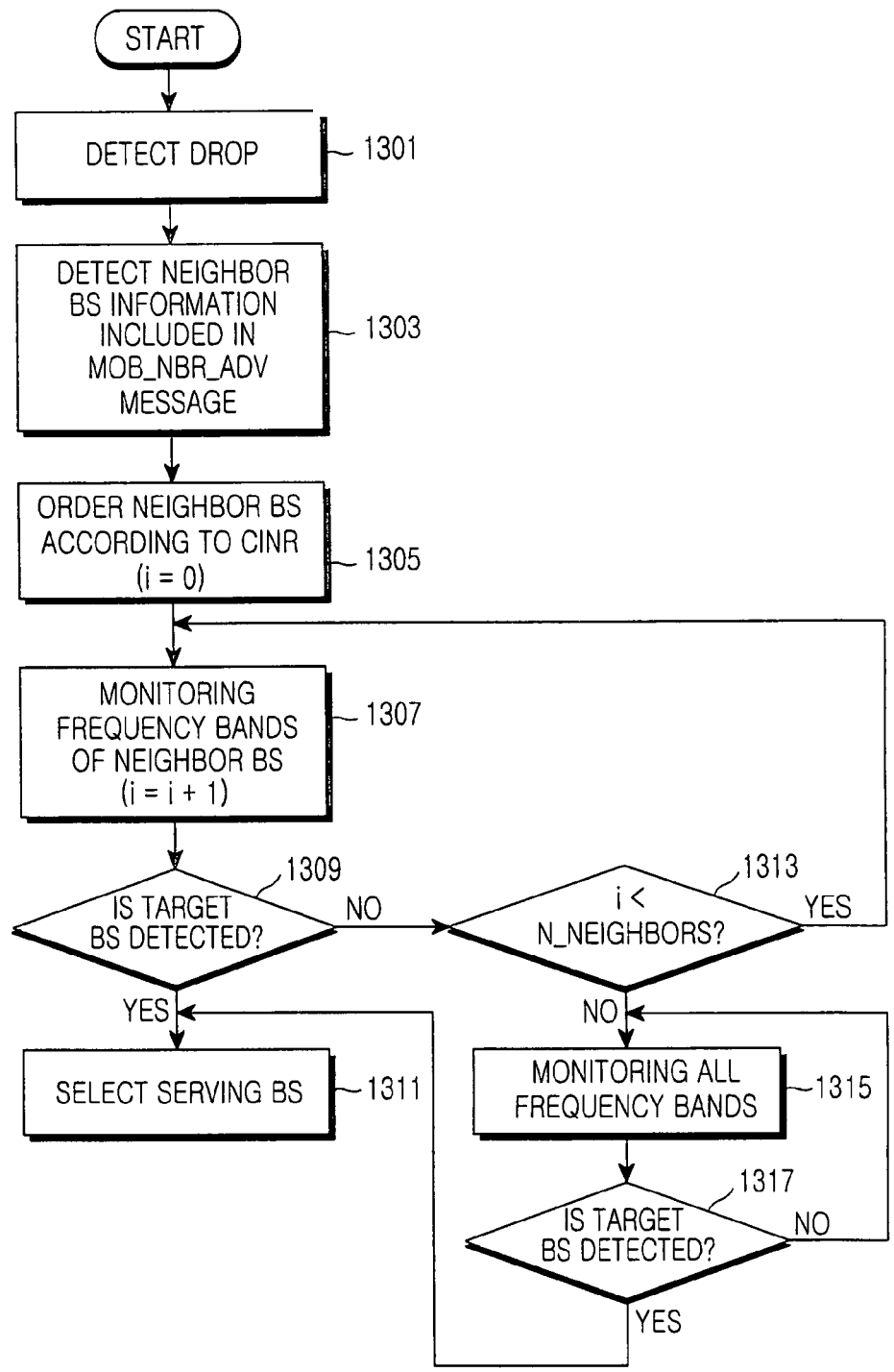
FIG. 13 is a flowchart illustrating a procedure for selecting a serving base station when a drop occurs before an MSS has received an MOB_HO_RSP message while a handover operation is being carried out at a request of a serving base station in an IEEE 802.16e communication system according to one embodiment of the present invention.

FIG. 13 is a flowchart illustrating the procedure for selecting the serving base station when the drop occurs in the MSS before the MSS has received the MOB_HO_RSP message while the handover operation is being carried out at the request of the serving base station in an IEEE 802.16e communication system according to one embodiment of the present invention.

Prior to explaining FIG. 13, it should be noted that if the drop occurs in the MSS before the MSS has received the MOB_HO_RSP message while the handover operation is being carried out at the request of the serving base station, it may be equal to a case in which the drop occurs in the MSS after the MSS, receiving a mobile scanning interval allocation response ("MOB_SCN_RSP") message during the non-handover of the MSS, has scanned the CINRs of pilot channel signals transmitted from the neighbor base stations. Therefore, although FIG. 13 shows the procedure for selecting the serving base station when the drop occurs in the MSS before the MSS has received the MOB_HO_RSP message, if the drop occurs in the MSS before the MSS has received the MOB_HO_RSP message while the handover operation is being carried out at the request of the serving base station, it may be equal to a case in which the drop occurs in the MSS after the MSS receiving the MOB_SCN_RSP message during the non-handover of the MSS has scanned the CINRs of pilot channel signals transmitted from the neighbor base stations.

Referring to FIG. 13, the MSS detects the drop occurring in the MSS in step 1301. In step 1303, the MSS detects information related to the neighbor base stations included in the MOB_NBR_ADV message, which has been transmitted to the MSS from the serving base station before the drop occurs in the MSS. In step 1305, the MSS sequentially orders the detected neighbor base stations in the order of the value of the CINR and sets a parameter i, used for monitoring the frequency bands of the neighbor base stations, to "0" (i=0). The parameter i represents the number of neighbor base stations subject to the frequency band monitoring. In step 1307, the MSS sequentially selects the information related to the neighbor base stations one by one (i=i+1) in the order of the CINR value of the neighbor base stations in order to monitor the frequency bands of the neighbor base stations.

In step 1309, the MSS determines whether or not the target base station is detected through the frequency band monitoring for the neighbor base stations. If it is determined that the target base station is not detected through the frequency band monitoring for the neighbor base stations in step 1309, the procedure goes to step 1313. In step 1313, the MSS determines whether or not the parameter i representing the number of neighbor base stations subject to the frequency band monitoring is less than the number of neighbor base stations (N_NEIGHBORS) included in the MOB_NBR_ADV message. If it is determined that the parameter i representing the number of neighbor base stations subject to the frequency band monitoring is less than the N_NEIGHBORS included in the MOB_NBR_ADV message in step 1313, the procedure returns to step 1307.

If it is determined in step 1313 that the parameter i representing the number of neighbor base stations subject to the frequency band monitoring exceeds the N_NEIGHBORS included in the MOB_NBR_ADV message, the procedure goes to step 1315. In step 1315, since the MSS fails to select the target base station from among the neighbor base stations, the MSS monitors all of the frequency bands preset in the MSS. In step 1317, the MSS determines whether or not the target base station is detected. If it is determined that the target base station is not detected in step 1317, the procedure returns to step 1315. In addition, if it is determined that the target base station is detected in step 1317, the procedure goes to step 1311.

If it is determined that the target base station is detected through the frequency band monitoring for the neighbor base stations in step 1309, the procedure goes to step 1311. In step 1311, the MSS selects one target base station from among the detected target base stations as a new serving base station for the MSS. If a plurality of target base stations are detected through step 1317, the MSS selects one target base station as a new serving base station for the MSS based on the value of the CINR.

Figure 14:
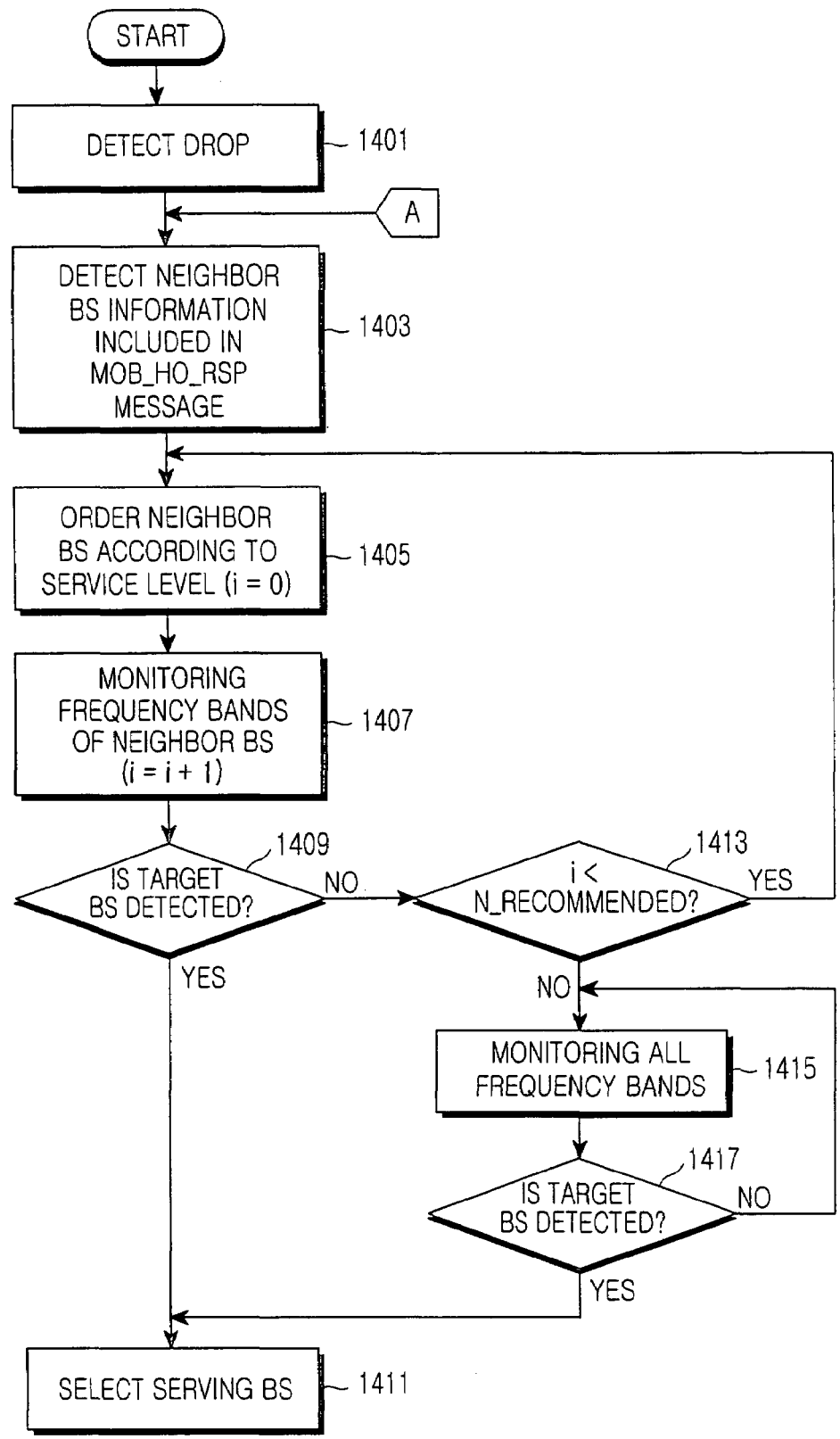
FIG. 14 is a flowchart illustrating a procedure for selecting a serving base station when a drop occurs after an MSS has received an MOB_HO_RSP message during a handover operation in an IEEE 802.16e communication system according to one embodiment of the present invention.

FIG. 14 is a flowchart illustrating the procedure for selecting the serving base station when the drop occurs in the MSS after the MSS has received an MOB_HO_RSP message during the handover operation in an IEEE 802.16e communication system according to one embodiment of the present invention.

Prior to explaining FIG. 14, it should be noted that the MOB_HO_RSP message is transmitted from the MSS to the serving base station during the handover operation carried out at the request of the MSS or the serving base station and the handover operation performed at the request of the MSS must be differentiated from the handover operation performed at the request of the serving base station in the method for selecting the serving base station shown in FIG. 14.

Referring to FIG. 14, the MSS detects the drop occurring in the MSS in step 1401. In step 1403, the MSS detects information related to the neighbor base stations included in the MOB_HO_RSP message, which has been transmitted to the MSS from the serving base station before the drop occurs in the MSS. As described with reference to Table 14, the information related to the neighbor base stations included in the MOB_HO_RSP message represents information related to the N_RECOMMENDED target base stations, which are selected from handover-support target base stations and capable of providing the bandwidth and service level requested by the MSS.

In step 1405, the MSS sequentially orders the detected neighbor base stations in the order of the service level and sets a parameter i, used for monitoring frequency bands of the neighbor base stations, to "0" (i=0). Then, the procedure goes to step 1407. The parameter i represents the number of neighbor base stations subject to the frequency band monitoring. In step 1407, the MSS sequentially selects the neighbor base stations one by one (i=i+1) in the order of the service level provided from the neighbor base stations so as to monitor the frequency bands of the neighbor base stations.

In step 1409, the MSS determines whether or not the target base station is detected through the frequency band monitoring for the neighbor base stations. If it is determined that the target base station is not detected through the frequency band monitoring for the neighbor base stations in step 1409, the procedure goes to step 1413. In step 1413, the MSS determines whether or not the parameter i representing the number of neighbor base stations subject to the frequency band monitoring is less than the number of neighbor base stations (N_RECOMMENDED) included in the MOB_HO_RSP message. If it is determined that the parameter i representing the number of neighbor base stations subject to the frequency band monitoring is less than the N_RECOMMENDED included in the MOB_HO_RSP message in step 1413, the procedure returns to step 1407.

If it is determined in step 1413 that the parameter i representing the number of neighbor base stations subject to the frequency band monitoring exceeds the N_RECOMMENDED included in the MOB_HO_RSP message, the procedure goes to step 1415. In step 1415, since the MSS fails to detect the target base station from among the neighbor base stations, the MSS monitors all of the frequency bands preset in the MSS. In step 1417, the MSS determines whether or not the target base station is detected. If it is determined that the target base station is not detected in step 1417, the procedure returns to step 1415. If it is determined that the target base station is detected in step 1417, the procedure goes to step 1411.

If it is determined that the target base station is detected through the frequency band monitoring for the neighbor base stations in step 1409, the procedure goes to step 1411. In step 1411, the MSS selects one target base station from among the detected target base stations as a new serving base station for the MSS. If a plurality of target base stations are detected through step 1417, the MSS selects one target base station as a new serving base station for the MSS based on the value of the CINR, etc.

Figure 15:
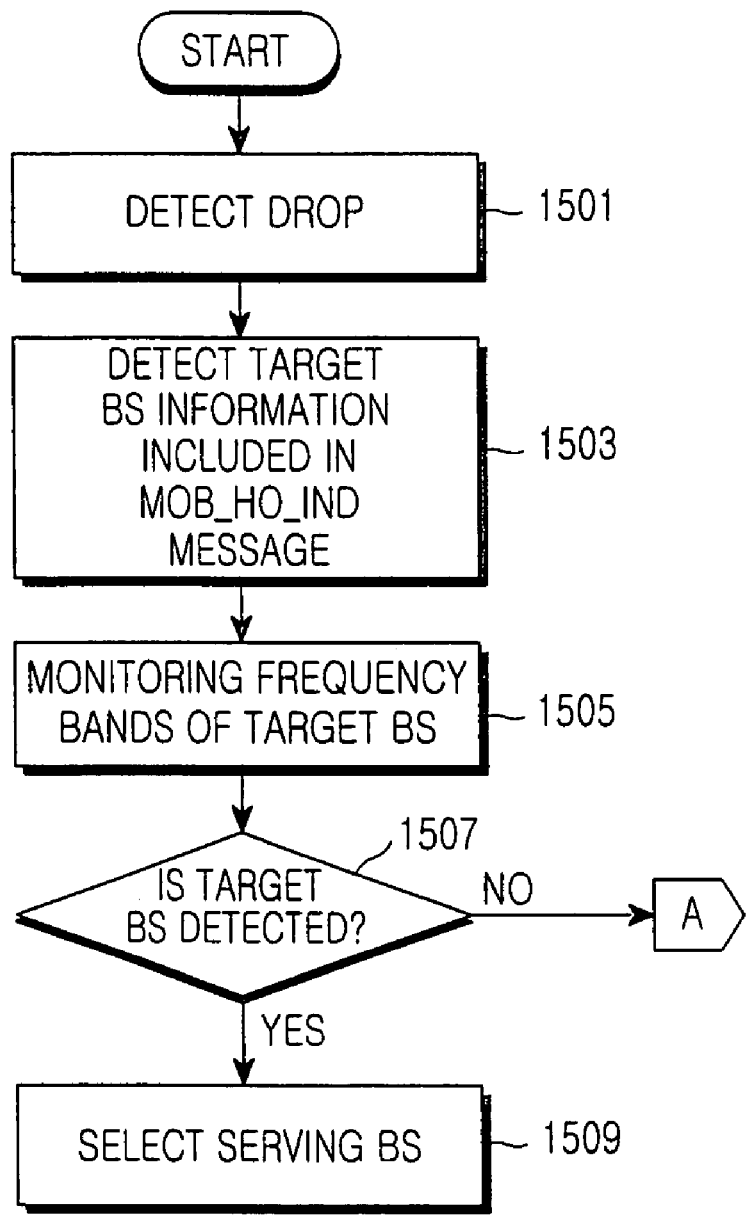
FIG. 15 is a flowchart illustrating a procedure for selecting a serving base station when a drop occurs after an MSS has transmitted an MOB_HO_IND message during a handover operation in an IEEE 802.16e communication system according to one embodiment of the present invention.

FIG. 15 is a flowchart illustrating the procedure for selecting the serving base station when the drop occurs in the MSS after the MSS has transmitted the MOB_HO_IND message during the handover operation in the IEEE 802.16e communication system according to one embodiment of the present invention.

Prior to explaining FIG. 15, it should be noted that the MOB_HO_IND message is transmitted from the MSS to the serving base station during the handover operation carried out at the request of the MSS or the serving base station and the handover operation performed at the request of the MSS must be differentiated from the handover operation performed at the request of the serving base station in the method for selecting the serving base station shown in FIG. 14.

Referring to FIG. 15, the MSS detects the drop occurring in the MSS in step 1501. In step 1503, the MSS detects related to the neighbor base stations included in the MOB_HO_IND message, which has been transmitted to the serving base station before the drop occurs in the MSS. The MOB_HO_IND message includes information related to the final target base station of the MSS. A configuration of the MOB_HO_IND message is identical to the configuration of the MOB_HO_IND message described with reference to Table 15, so it will not be further described below.

In step 1505, the MSS monitors the frequency band of the target base station detected from the MOB_HO_IND message. Then, the procedure goes to step 1507. In step 1507, the MSS determines whether or not the target base station detected from the MOB_HO_IND message is detected as a target base station of the MSS. If it is determined that the target base station detected from the MOB_HO_IND message is not detected as a target base station of the MSS in step 1507, the procedure goes to step 1403 shown in FIG. 14. In addition, if it is determined that the target base station detected from the MOB_HO_IND message is not detected as a target base station of the MSS in step 1507, the procedure goes to step 1509. In step 1509, the MSS selects the detected target base station as a new serving base station for the MSS. A ranging procedure of an MSS by using a drop ranging code for allowing the MSS to reestablish communication within a short period of time when the drop occurs in the MSS in an IEEE 802.16e communication system will be described with reference to FIG. 16.

Figure 16:
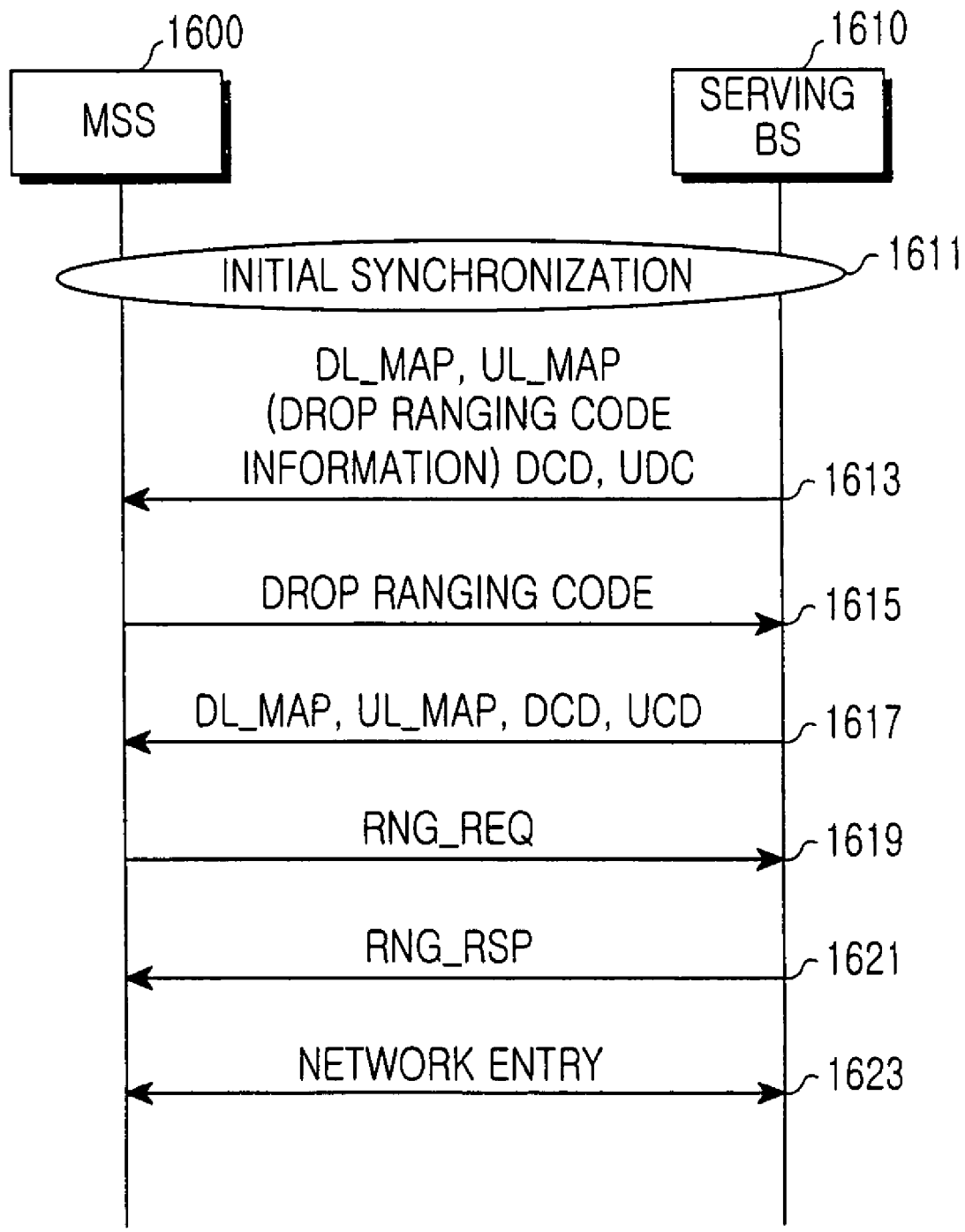
FIG. 16 is a signal flow diagram illustrating a drop ranging procedure of an MSS, which is subject to a drop, by using a drop ranging code in an IEEE 802.16e communication system according to one embodiment of the present invention.

FIG. 16 is a signal flow diagram illustrating the ranging procedure of the MSS by using a drop ranging code when the drop occurs in the MSS in the IEEE 802.16e communication system according to one embodiment of the present invention.

Prior to explaining FIG. 16, the rangings used for the IEEE 802.16e communication system are classified into an initial ranging, a maintenance ranging, that is, a periodic ranging, and a bandwidth request ranging in the same manner as the rangings used for the IEEE 802.16a communication system. The initial ranging, the periodic ranging, and the bandwidth request ranging used for the IEEE 802.16e communication system are identical to those of the IEEE 802.16a communication system, so they will not be further described below.

As described above with regard to the prior art, the base station must assign the available ranging codes according to the objects of the rangings, that is, according to the type of the rangings. In the IEEE 802.16e communication system, the ranging codes are created by segmenting a pseudo-random noise ("PN") sequence having a predetermined bit length (for example, $2^{15}-1$ bits) into predetermined ranging code units. For instance, a maximum of Q ranging codes (RC #1 to RC #Q) can be created.

In the current IEEE 802.16e communication system, the Q ranging codes are differently assigned according to the objects of the rangings, that is, according to the initial ranging, the periodic ranging and the bandwidth request ranging. For instance, N ranging codes are assigned for the initial ranging, M ranging codes are assigned for the periodic ranging, and L ranging codes are assigned for the bandwidth request ranging. The total number (Q) of the ranging codes is equal to the sum of the N ranging codes for the initial ranging, the M ranging codes for the periodic ranging and the L ranging codes for the bandwidth request ranging (Q=N+M+L).

However, according to the present invention, the Q ranging codes are differently assigned for the purpose of four rangings, that is, the initial ranging, the periodic ranging, the bandwidth request ranging and the drop ranging. For instance, A ranging codes are assigned for the initial ranging, B ranging codes are assigned for the periodic ranging, C ranging codes are assigned for the bandwidth request ranging, and D ranging codes are assigned for the drop ranging. Herein, the total number (Q) of the ranging codes is equal to the sum of the A ranging codes for the initial ranging, the B ranging codes for the periodic ranging, the C ranging codes for the bandwidth request ranging, and the D ranging codes for the drop ranging (Q=A+B+C+D).

In addition, the drop ranging suggested by the present invention signifies a ranging carried out for primarily reestablishing a communication when the drop occurs during communication. An operation of the drop ranging is actually similar to that of the initial ranging. When the MSS having the drop performs the drop ranging by using drop ranging codes, the base station determines that the MSS tries to reestablish the communication with regard to the base station after the drop occurs in the MSS, so the base station primarily reestablishes the communication with respect to the MSS.

Referring to FIG. 16, when an initial synchronization is achieved between an MSS 1600 and a serving base station 1610 (step 1611), the MSS 1600 receives a DL_MAP message, an UL_MAP message, a DCD message, and an UCD message from the serving base station 1610 (step 1613). As described above, in one embodiment of the present invention, the UL_MAP message includes an information of drop ranging codes. The serving base station 1610 is a new serving base station selected by the MSS 1600 after the drop occurs in the MSS 1600.

The MSS 1600 transmits the drop ranging code to the serving base station 1610 (step 1615) in such a manner that the serving base station 1610 can recognize that the MSS 1600 is attempting to reestablish a communication after the drop occurs in the MSS 1600. Upon receiving the drop ranging code from the MSS 1600, the serving base station 1610 may recognize that the MSS 1600 is attempting to reestablish the communication with regard to the serving base station 1610 after the drop, so the serving base station 1610 transmits the DL_MAP message, the UL_MAP message, the DCD message, and the UCD message to the MSS 1600 (step 1617). The UL_MAP message transmitted to the MSS 1600 in step 1617 may include information related to the time slot assignment for allowing the MSS 1600 to transmit the RNG_REQ message through a time slot.

The MSS 1600 transmits the RNG_REQ message including coded information and information related to a former serving base station, which communicates with the MSS 1600 before MSS 1600 has been subject to the drop, to the serving base station 1610 through a time slot corresponding to the time slot assignment information included in the UL_MAP message in order to reestablish the communication with respect to the serving base station 1610 (step 1619). The serving base station 1610 then transmits the RNG_RSP message to the MSS 1600 in response to the RNG_REQ message (step 1621).

Since the MSS 1600 is an MSS for reestablishing communication with regard to the serving base station 1610 after the drop, the serving base station primarily assigns resources to the MSS 1600 in such a manner that the MSS 1600 can perform the network-entry procedure in a contention-free manner. The network-entry procedure of the MSS 1600 includes registration and authentication between the MSS 1600 and the serving base station. Upon receiving the RNG_RSP message from the serving base station 1610, the MSS 1600 performs the network-entry procedure in relation to the serving base station 1610 (step 1623).

A drop ranging procedure of an MSS by using a drop ranging time slot for allowing the MSS to reestablish communication within a short period of time when the drop occurs in the MSS in an IEEE 802.16e communication system will be described with reference to FIG. 17.

Figure 17:
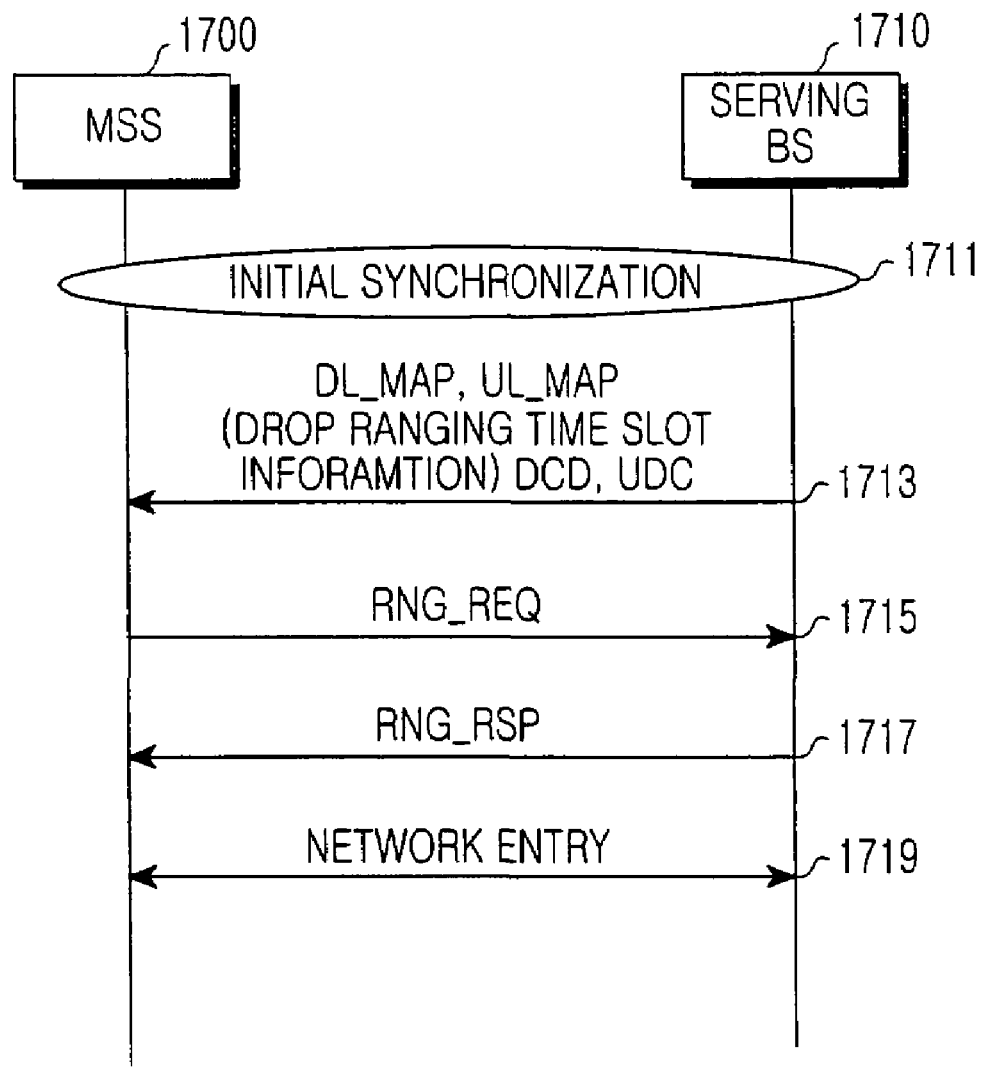
FIG. 17 is a signal flow diagram illustrating a drop ranging procedure of an MSS, which is subject to a drop, by using a drop ranging time slot in an IEEE 802.16e communication system according to one embodiment of the present invention.

FIG. 17 is a signal flow diagram illustrating the drop ranging procedure of the MSS, which is subject to the drop, by using the drop ranging time slot in the IEEE 802.16e communication system according to one embodiment of the present invention.

Referring to FIG. 17, when an initial synchronization is achieved between an MSS 1700 and a serving base station 1710 (step 1711), the MSS 1700 receives a DL_MAP message, an UL_MAP message, a DCD message, and an UCD message from the serving base station 1710 (step 1713). As described above, in one embodiment of the present invention, the UL_MAP message includes an information of drop ranging time slots. The serving base station 1710 is a new serving base station selected by the MSS 1700 after the drop occurs in the MSS 1700. The UL_MAP message may include information related to a drop ranging offset, that is, information related to a drop ranging time slot. A drop ranging information element (Drop_Ranging IE) of the UL_MAP message according to the present invention is represented in Table 16.

TABLE 16

| Drop Ranging IE { | size | notes |
|---|---|---|
| UIUC | 4 bits | |
| Drop ranging offset | 12 bits | Indicates the start time of the burst relative to the Allocation Start Time given in the UL MAP message. |
| reserved | 4 bits | |
| } | | |

In addition, the MSS 1700 transmits the RNG_REQ message to the serving base station 1710 using the drop ranging time slot (step 1715) in such a manner that the serving base station 1710 can recognize that the MSS 1700 is attempting to reestablish the communication with regard to the serving base station 1710 after the drop occurs in the MSS 1700. Upon receiving the RNG_REQ message from the MSS 1700, the serving base station 1710 may recognize that the MSS 1700 is attempting to reestablish the communication after the drop, so the serving base station 1710 transmits the RNG_RSP message to the MSS 1700 in response to the RNG_REQ message (step 1717). Since the MSS 1700 is an MSS for reestablishing communication with regard to the serving base station 1710 after the drop, the serving base station 1710 primarily assigns resources to the MSS 1700 in such a manner that the MSS 1700 can perform the network-entry procedure in a contention-free manner. Upon receiving the RNG_RSP message from the serving base station 1710, the MSS 1700 performs the network-entry procedure in relation to the serving base station 1710 (step 1719).

As described above, according to the present invention, the number of target base stations, which must be monitored for allowing the MSS to reestablish a communication with regard to the target base station when the MSS is subject to the drop while making communication with the serving base station, can be reduced so that the MSS can reestablish the communication with regard to the target base station within a short period of time in a broadband wireless access communication system using the OFDM/OFDMA schemes, such as the IEEE 802.16e communication system. In addition, when the MSS reestablishes the communication with regard to the serving base station in the IEEE 802.16e communication system, the MSS notifies the new serving base station of the reestablishment of the communication by using the drop ranging codes. Thus, the new serving base station may primarily assign resources to the MSS such that the MSS can reestablish communication with regard to the new serving base station within a short period of time, thereby improving service quality of the IEEE 802.16e communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of selecting a new serving base station when a drop occurs in a mobile subscriber station in a broadband wireless access communication system including the mobile subscriber station, a serving base station communicating with the mobile subscriber station, and a plurality of neighbor base stations, different from the serving base station, the method comprising the steps of:
   i) detecting the drop after receiving information related to the neighbor base stations transmitted from the serving base station communicating with the mobile subscriber station;
   ii) monitoring frequency bands of the neighbor base stations included in the information related to the neighbor base stations, if the drop is detected;
   iii) detecting target base stations capable of serving as the new serving base station for communicating with the mobile subscriber station when the drop occurs in the mobile subscriber station according to a monitoring result for the frequency bands of the neighbor base stations;
   iv) selecting the new serving base station from the detected target base stations; and
   v) controlling the new serving base station by performing drop ranging in relation to the new serving base station using a predetermined drop ranging code after selecting the new serving base station in such a manner that the new serving base station recognizes that the mobile subscriber station is attempting to reestablish a communication with regard to the new base station due to the drop occurring in the mobile subscriber station.

2. The method as claimed in claim 1, wherein step i) comprises the substeps of repeatedly transmitting a ranging request message to the serving base station if a ranging response message is not received within a predetermined period of time in response to the ranging request message after transmitting the ranging request message to the serving base station, and detecting the drop if a ranging response message is not received within a predetermined period of time after repeatedly transmitting the ranging request message to the serving base station.

3. The method as claimed in claim 1, wherein step i) comprises a substep of detecting the drop if a channel quality of a downlink signal transmitted from the serving base station is less than a reference channel quality during a predetermined interval.

4. The method as claimed in claim 3, wherein the channel quality is determined based on a result of a cyclic redundancy check for the downlink signal.

5. The method as claimed in claim 1, wherein, in step ii), a carrier to interference and noise ratio of a reference channel signal is measured at each frequency band of the neighbor base stations.

6. The method as claimed in claim 5, wherein, in step iii), neighbor base stations transmitting reference channel signals having a carrier to interference and noise ratio greater than a reference carrier to interference and noise ratio are detected as target base stations.

7. The method as claimed in claim 6, further comprising the steps of:
   a) monitoring all of the frequency bands preset in the mobile subscriber station when the target base station is not detected after monitoring frequency bands of the neighbor base stations;
   b) detecting the target base stations corresponding to a monitoring result for all of the frequency bands; and
   c) selecting the new serving base station from the target base stations detected in step b).

8. The method as claimed in claim 7, wherein, in step a), a carrier to interference and noise ratio of a reference channel signal is measured at all frequency bands.

9. The method as claimed in claim 8, wherein, in step b), neighbor base stations transmitting reference channel signals having a carrier to interference and noise ratio greater than a reference carrier to interference and noise ratio and being received through all frequency bands are detected as target base stations.

10. The method as claimed in claim 1, wherein the drop ranging is used for reestablishing a communication with regard to the new serving base station when the drop occurs in the mobile subscriber station.

11. A method of selecting a new serving base station when a drop occurs in a mobile subscriber station in a broadband wireless access communication system including the mobile subscriber station, a serving base station communicating with the mobile subscriber station, and a plurality of neighbor base stations, different from the serving base station, the method comprising the steps of:
   i) detecting the drop after receiving information related to the neighbor base stations transmitted from the serving base station communicating with the mobile subscriber station;
   ii) monitoring frequency bands of the neighbor base stations included in the information related to the neighbor base stations, if the drop is detected;
   iii) detecting target base stations capable of serving as the new serving base station for communicating with the mobile subscriber station when the drop occurs in the mobile subscriber station according to a monitoring result for the frequency bands of the neighbor base stations;
   iv) selecting the new serving base station from the detected target base stations; and v) controlling the new serving base station by performing drop ranging in relation to the new serving base station at a predetermined drop ranging time slot after selecting the new serving base station in such a manner that the new serving base station recognizes that the mobile subscriber station is attempting to reestablish a communication with regard to the new base station due to the drop occurring in the mobile subscriber station.

12. The method as claimed in claim 11, wherein the drop ranging is used for reestablishing a communication with regard to the new serving base station when the drop occurs in the mobile subscriber station.

13. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations different from the serving base station, the method comprising the steps of:

i) receiving information related to the n neighbor base stations transmitted from the serving base station communicating with the mobile subscriber station and monitoring frequency bands of the n neighbor base stations included in the information related to the n neighbor base stations;

ii) determining by the serving base station the handover operation and detecting m neighbor base stations, where $m \leq n$, capable of serving as a new serving station according to a monitoring result for the frequency bands of the n neighbor base stations;

iii) sending a signal requesting a handover to the serving base station based on information about the m neighbor base stations;

iv) monitoring frequency bands of the m neighbor base stations if the drop occurs after requesting the handover;

v) detecting target base stations capable of serving as a new serving station according to a monitoring result for the frequency bands of the m neighbor base stations;

vi) selecting the new serving station from the target base stations detected in step v); and v) controlling the new serving base station by performing drop ranging in relation to the new serving base station using a predetermined drop ranging code after selecting the new serving base station in such a manner that the new serving base station recognizes that the mobile subscriber station is attempting to reestablish communication with regard to the new base station due to the drop occurring in the mobile subscriber station.

14. The method as claimed in claim 13, wherein the drop is detected by repeatedly transmitting a ranging request message to the serving base station if a ranging response message is not received within a predetermined period of time in response to the ranging request message after transmitting the ranging request message to the serving base station, and detecting the drop if a ranging response message is not received within a predetermined period of time after repeatedly transmitting the ranging request message to the serving base station.

15. The method as claimed in claim 13, wherein the drop is detected if channel quality of a downlink signal transmitted from the serving base station is less than reference channel quality during a predetermined interval.

16. The method as claimed in claim 15, wherein the channel quality is determined based on a result of a cyclic redundancy check for the downlink signal transmitted from the serving base station.

17. The method as claimed in claim 13, wherein, in step i), a carrier to interference and noise ratio of a reference channel signal is measured at each of the frequency band of the neighbor base stations.

18. The method as claimed in claim 17, wherein step iv) comprises the substeps of sequentially ordering the m neighbor base stations according to a value of the carrier to interference and noise ratio of the reference channel signal transmitted from the m neighbor base stations and detected when requesting the handover, and detecting the carrier to interference and noise ratio of the reference channel signal received at each of the frequency band of the m ordered neighbor base stations.

19. The method as claimed in claim 17, wherein, in step v), neighbor base stations transmitting reference channel signals having a carrier to interference and noise ratio greater than a reference carrier to interference and noise ratio are detected as target base stations.

20. The method as claimed in claim 13, further comprising the steps of:

a) monitoring all of the frequency bands preset in the mobile subscriber station when the target base station is not detected after monitoring frequency bands of the m neighbor base stations;

b) detecting the target base stations corresponding to a monitoring result for all frequency bands; and c) selecting the new serving base station from the target base stations detected in step b).

21. The method as claimed in claim 20, wherein, in step a), a carrier to interference and noise ratio of a reference channel signal is measured at all of the frequency bands.

22. The method as claimed in claim 21, wherein, in step b), neighbor base stations transmitting reference channel signals having a carrier to interference and noise ratio greater than a reference carrier to interference and noise ratio and received through all of the frequency bands are detected as target base stations.

23. The method as claimed in claim 13, wherein the drop ranging is used for reestablishing a communication with regard to the new serving base station when the drop occurs in the mobile subscriber station.

24. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations different from the serving base station, the method comprising the steps of:

i) receiving information related to the n neighbor base stations transmitted from the serving base station communicating with the mobile subscriber station and monitoring frequency bands of the n neighbor base stations included in the information related to the n neighbor base stations;

ii) determining by the serving base station the handover operation and detecting m neighbor base stations, where $m \leq n$, capable of serving as a new serving station according to a monitoring result for the frequency bands of the n neighbor base stations;

iii) sending a signal requesting a handover to the serving base station based on information about the m neighbor base stations;
iv) monitoring frequency bands of the m neighbor base stations if the drop occurs after requesting the handover;
v) detecting target base stations capable of serving as a new serving station according to a monitoring result for the frequency bands of the m neighbor base stations;
vi) selecting the new serving station from the target base stations detected in step v); and
v) controlling the new serving base station by performing drop ranging in relation to the new serving base station at a predetermined drop ranging time slot after selecting the new serving base station in such a manner that the new serving base station recognizes that the mobile subscriber station is attempting to reestablish communication with regard to the new base station due to the drop occurring in the mobile subscriber station.

25. The method as claimed in claim 24, wherein the drop ranging is used for reestablishing a communication with regard to the new serving base station when the drop occurs in the mobile subscriber station.

26. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations, different from the serving base station, the method comprising the steps of:
i) receiving information related to the neighbor base stations transmitted from the serving base station communicating with the mobile subscriber station and monitoring frequency bands of the neighbor base stations included in the information about the neighbor base stations;
ii) monitoring each of the frequency band of neighbor base stations if the drop is detected after monitoring the frequency bands of the neighbor base stations;
iii) detecting target base stations capable of serving as the new serving base station according to a monitoring result for each frequency band of neighbor base stations;
iv) selecting the new serving base station from the target base stations detected in step iii); and
v) controlling the new serving base station by performing drop ranging in relation to the new serving base station using a predetermined drop ranging code after selecting the new serving base station in such a manner that the new serving base station recognizes that the mobile subscriber station is attempting to reestablish a communication with regard to the new base station due to the drop occurring in the mobile subscriber station.

27. The method as claimed in claim 26, wherein the drop is detected by repeatedly transmitting a ranging request message to the serving base station if a ranging response message is not received within a predetermined period of time in response to the ranging request message after transmitting the ranging request message to the serving base station, and detecting the drop if a ranging response message is not received within a predetermined period of time after repeatedly transmitting the ranging request message to the serving base station.

28. The method as claimed in claim 26, wherein the drop is detected if a channel quality of a downlink signal transmitted from the serving base station is less than a reference channel quality during a predetermined interval.

29. The method as claimed in claim 28, wherein the channel quality is determined based on a result of a cyclic redundancy check for the downlink signal transmitted from the serving base station.

30. The method as claimed in claim 26, wherein step ii) comprises the substeps of sequentially ordering the neighbor base stations according to a value of the carrier to interference and noise ratio of the reference channel signal transmitted from the neighbor base stations and detected before the drop occurs, and measuring the carrier to interference and noise ratio of the reference channel signal at each of the frequency band of the ordered neighbor base stations.

31. The method as claimed in claim 30, wherein, in step iii), neighbor base stations transmitting reference channel signals having a carrier to interference and noise ratio greater than a reference carrier to interference and noise ratio are detected as target base stations.

32. The method as claimed in claim 26, further comprising the steps of:
a) monitoring all of the frequency bands preset in the mobile subscriber station when the target base station is not detected after monitoring the frequency bands of the neighbor base stations;
b) detecting the target base stations corresponding to a monitoring result for all frequency bands; and
c) selecting the new serving base station from the target base stations detected in step b).

33. The method as claimed in claim 32, wherein, in step a), a carrier to interference and noise ratio of a reference channel signal is measured at all of the frequency bands.

34. The method as claimed in claim 33, wherein, in step b), neighbor base stations transmitting reference channel signals having a carrier to interference and noise ratio greater than a reference carrier to interference and noise ratio and received through all of the frequency bands are detected as target base stations.

35. The method as claimed in claim 26, wherein the drop ranging is used for reestablishing communication with regard to the new serving base station when the drop occurs in the mobile subscriber station.

36. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations, different from the serving base station, the method comprising the steps of:
i) receiving information related to the neighbor base stations transmitted from the serving base station communicating with the mobile subscriber station and monitoring frequency bands of the neighbor base stations included in the information about the neighbor base stations;
ii) monitoring each of the frequency band of neighbor base stations if the drop is detected after monitoring the frequency bands of the neighbor base stations;
iii) detecting target base stations capable of serving as the new serving base station according to a monitoring result for each frequency band of neighbor base stations;
iv) selecting the new serving base station from the target base stations detected in step iii); and
v) controlling the new serving base station by performing drop ranging in relation to the new serving base station at a predetermined drop ranging time slot after selecting the new serving base station in such a manner that the new serving base station recognizes that the mobile subscriber station is attempting to reestablish a communication with regard to the new base station due to the drop occurring in the mobile subscriber station.

37. The method as claimed in claim 36, wherein the drop ranging is used for reestablishing communication with regard to the new serving base station when the drop occurs in the mobile subscriber station.

38. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations, different from the serving base station, the method comprising the steps of:
   i) receiving information related to the n neighbor base stations transmitted from the serving base station communicating with the mobile subscriber station and monitoring frequency bands of the n neighbor base stations included in the information related to the n neighbor base stations;
   ii) determining by the serving base station the handover operation and detecting m neighbor base stations, where $m \leq n$, capable of serving as a new serving station according to a monitoring result for the frequency bands of the n neighbor base stations;
   iii) sending a signal requesting a handover to the serving base station based on information related the m neighbor base stations;
   iv) receiving a handover response including information about k recommended neighbor base stations, where $k \leq m$, to which the mobile subscriber station is handed-over from the serving base station, according to a request for the handover;
   v) monitoring frequency bands of the k recommended neighbor base stations if the drop occurs after the request for the handover;
   vi) detecting target base stations capable of serving as a new serving station according to a monitoring result for the frequency bands of the k recommended neighbor base stations;
   vii) selecting the new serving station from the target base stations detected in step vi); and
   viii) controlling the new serving base station by performing drop ranging in relation to the new serving base station using a predetermined drop ranging code after selecting the new serving base station in such a manner that the new serving base station recognizes that the mobile subscriber station is attempting to reestablish a communication with regard to the new base station due to the drop occurring in the mobile subscriber station.

39. The method as claimed in claim 38, wherein the drop is detected by repeatedly transmitting a ranging request message to the serving base station if a ranging response message is not received within a predetermined period of time in response to the ranging request message after transmitting the ranging request message to the serving base station, and detecting the drop if a ranging response message is not received within a predetermined period of time after repeatedly transmitting the ranging request message to the serving base station.

40. The method as claimed in claim 39, wherein the drop is detected if channel quality of a downlink signal transmitted from the serving base station is less than reference channel quality during a predetermined interval.

41. The method as claimed in claim 40, wherein the channel quality is determined based on a result of a cyclic redundancy check for the downlink signal transmitted from the serving base station.

42. The method as claimed in claim 38, wherein, in step i), a carrier to interference and noise ratio of a reference channel signal is measured at each of the frequency bands of the neighbor base stations.

43. The method as claimed in claim 40, wherein step v) comprises the substeps of sequentially ordering the k recommended neighbor base stations in an order of a service level detected when requesting the handover, and detecting the carrier to interference and noise ratio of the reference channel signal received at each of the frequency bands of the k recommended neighbor base stations.

44. The method as claimed in claim 43, wherein, in step vi), the recommended neighbor base stations transmitting reference channel signals having the carrier to interference and noise ratio greater than a reference carrier to interference and noise ratio are detected as target base stations.

45. The method as claimed in claim 38, further comprising the steps:
   a) monitoring all of the frequency bands preset in the mobile subscriber station when the target base station is not detected after monitoring frequency bands of the k recommended neighbor base stations;
   b) detecting the target base stations corresponding to a monitoring result for all frequency bands; and
   c) selecting the new serving base station from the target base stations detected in step b).

46. The method as claimed in claim 45, wherein, in step a), a carrier to interference and noise ratio of a reference channel signal is measured at all of the frequency bands.

47. The method as claimed in claim 46, wherein, in step b), neighbor base stations transmitting reference channel signals having a carrier to interference and noise ratio greater than a reference carrier to interference and noise ratio and received through all frequency bands are detected as target base stations.

48. The method as claimed in claim 38, further comprising the steps of:
   a) selecting a final neighbor base station from the k recommended base stations after receiving the handover response such that the mobile subscriber station is handed-over to the final neighbor base station and sending a signal requesting the handover and including information about the selected final neighbor base station to the serving base station;
   b) monitoring a frequency band of the final neighbor base station if the drop is detected in step a); and
   c) selecting the final neighbor base station as a new serving base station if the final neighbor base station is detected as the target base station in step b).

49. The method as claimed in claim 48, further comprising the steps of:
   d) monitoring all of the frequency bands preset in the mobile subscriber station if the final neighbor base station is not detected as the target station;
   e) detecting target base stations corresponding to a monitoring result of step d); and
   f) selecting the new serving base station from the target neighbor base stations detected in step e).

50. The method as claimed in claim 38, wherein the drop ranging is used for reestablishing a communication with regard to the new serving base station when the drop occurs in the mobile subscriber station.

51. A method of selecting a new serving base station when a drop occurs in a mobile subscriber station during a handover operation of the mobile subscriber station from a serving base station to a neighbor base station in a broadband wireless access communication system including the mobile subscriber station, the serving base station communicating with the mobile subscriber station, and n neighbor base stations, different from the serving base station, the method comprising the steps of:

i) receiving information related to the n neighbor base stations transmitted from the serving base station communicating with the mobile subscriber station and monitoring frequency bands of the n neighbor base stations included in the information related to the n neighbor base stations;

ii) determining by the serving base station the handover operation and detecting m neighbor base stations, where m≦n, capable of serving as a new serving station according to a monitoring result for the frequency bands of the n neighbor base stations;

iii) sending a signal requesting a handover to the serving base station based on information related the m neighbor base stations;

iv) receiving a handover response including information about k recommended neighbor base stations, where k≦m, to which the mobile subscriber station is handed-over from the serving base station, according to a request for the handover;

v) monitoring frequency bands of the k recommended neighbor base stations if the drop occurs after the request for the handover;

vi) detecting target base stations capable of serving as a new serving station according to a monitoring result for the frequency bands of the k recommended neighbor base stations;

vii) selecting the new serving station from the target base stations detected in step vi); and viii) controlling the new serving base station by performing drop ranging in relation to the new serving base station at a predetermined drop ranging time slot after selecting the new serving base station in such a manner that the new serving base station recognizes that the mobile subscriber station is attempting to reestablish a communication with regard to the new base station due to the drop occurring in the mobile subscriber station.

52. The method as claimed in claim 51, wherein the drop ranging is used for reestablishing a communication with regard to the new serving base station when the drop occurs in the mobile subscriber station.

53. A system for selecting a new serving base station when a drop occurs in a mobile subscriber station in a broadband wireless access communication system including the mobile subscriber station, a serving base station communicating with the mobile subscriber station, and a plurality of neighbor base stations, different from the serving base station, the system comprising:

the mobile subscriber station for receiving information related neighbor base stations from the serving base station communicating with the mobile subscriber station, monitoring frequency bands of the neighbor base stations included in the information related to the neighbor base stations if the drop is detected in order to detect target base stations capable of serving as the new serving base station, selecting the new serving base station from the detected target base stations, and notifying the new serving base station of a reestablishment of a communication caused by the drop occurring in the mobile subscriber station; and the new serving base station assigning channel resources to the mobile subscriber station when the new serving base station receives a notification of the reestablishment of the communication from the mobile subscriber station, wherein the mobile subscriber station controls the new serving base station by performing drop ranging in relation to the new serving base station using a predetermined drop ranging code after selecting the new serving base station in such a manner that the new serving base station recognizes that the mobile subscriber station is attempting to reestablish a communication with regard to the new base station due to the drop occurring in the mobile subscriber station.

54. The system as claimed in claim 53, wherein mobile subscriber station repeatedly transmits a ranging request message to the serving base station if a ranging response message is not transmitted thereto within a predetermined period of time in response to the ranging request message after transmitting the ranging request message to the serving base station, and detects the drop if a ranging response message is not received within a predetermined period of time after repeatedly transmitting the ranging request message to the serving base station.

55. The system as claimed in claim 53, wherein the mobile subscriber station detects the drop if a channel quality of a downlink signal transmitted from the serving base station is less than a reference channel quality during a predetermined interval.

56. The system as claimed in claim 55, wherein mobile subscriber station determines the channel quality based on a result of a cyclic redundancy check for the downlink signal transmitted thereto from the serving base station.

57. The system as claimed in claim 53, wherein the mobile subscriber station detects a carrier to interference and noise ratio of a reference channel signal at each frequency band of the neighbor base stations in order to monitor the frequency bands of the neighbor base stations.

58. The system as claimed in claim 57, wherein the mobile subscriber station selects neighbor base stations transmitting reference channel signals having a carrier to interference and noise ratio greater than a reference carrier to interference and noise ratio as target base stations.

59. The system as claimed in claim 58, wherein the mobile subscriber station detects the target base stations by monitoring all of the frequency bands preset in the mobile subscriber station if the target base station is not detected after monitoring frequency bands of the neighbor base stations, and selects the new serving base station from the detected target base stations.

60. The system as claimed in claim 53, wherein the drop ranging is used for reestablishing the communication with regard to the new serving base station when the drop occurs in the mobile subscriber station.

61. A system for selecting a new serving base station when a drop occurs in a mobile subscriber station in a broadband wireless access communication system including the mobile subscriber station, a serving base station communicating with the mobile subscriber station, and a plurality of neighbor base stations, different from the serving base station, the system comprising:

the mobile subscriber station for receiving information related neighbor base stations from the serving base station communicating with the mobile subscriber station, monitoring frequency bands of the neighbor base stations included in the information related to the neighbor base stations if the drop is detected in order to detect target base stations capable of serving as the new serving base station, selecting the new serving base station from the detected target base stations, and notifying the new serving base station of a reestablishment of a communication caused by the drop occurring in the mobile subscriber station; and the new serving base station assigning channel resources to the mobile subscriber station when the new serving base station receives a notification of the reestablishment of the communication from the mobile subscriber station, wherein the mobile subscriber station controls the new serving base station by performing drop ranging in relation to the new serving base station at a predetermined drop ranging time slot after selecting the new serving base station in such a manner that the new serving base station recognizes that the mobile subscriber station is attempting to reestablish a communication with regard to the new base station due to the drop occurring in the mobile subscriber station.

62. The system as claimed in claim 61, wherein the drop ranging is used for reestablishing the communication with regard to the new serving base station when the drop occurs in the mobile subscriber station.

* * * * *